(12) United States Patent
Sugimoto

(10) Patent No.: US 8,446,486 B2
(45) Date of Patent: May 21, 2013

(54) TARGET DETECTING APPARATUS, IMAGE FILE RECORDING APPARATUS AND METHODS OF CONTROLLING SAME

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 156 days.

(21) Appl. No.: 12/951,719

(22) Filed: Nov. 22, 2010

(65) Prior Publication Data

US 2011/0063477 A1  Mar. 17, 2011

Related U.S. Application Data

(62) Division of application No. 11/643,784, filed on Dec. 22, 2006, now abandoned.

(30) Foreign Application Priority Data

Jan. 18, 2006  (JP) .................................. 2006-009797

(51) Int. Cl.
*H04N 5/228* (2006.01)
*G06K 9/62* (2006.01)

(52) U.S. Cl.
USPC ....................................... 348/222.1; 382/209

(58) Field of Classification Search
USPC ............... 348/333.01, 333.02, 169, 345, 346, 348/222.1; 382/162, 167, 209
See application file for complete search history.

(56) References Cited

U.S. PATENT DOCUMENTS

| | | | |
|---|---|---|---|
| 2003/0071908 | A1 | 4/2003 | Sannoh et al. |
| 2004/0145670 | A1 | 7/2004 | Hong |
| 2004/0233296 | A1 | 11/2004 | Sugimoto |
| 2006/0012702 | A1 | 1/2006 | Kawahara et al. |
| 2006/0044422 | A1 | 3/2006 | Miyazaki |

FOREIGN PATENT DOCUMENTS

| | | |
|---|---|---|
| JP | 2003-107335 A | 4/2003 |
| JP | 2003-344891 A | 12/2003 |

*Primary Examiner* — Kelly L Jerabek
(74) *Attorney, Agent, or Firm* — Birch, Stewart, Kolasch & Birch, LLP

(57) ABSTRACT

It is so arranged that a user can check whether face detection processing has been set. The back side of a digital still camera is provided with a face detection button for setting whether face detection processing is ON or OFF. If the button is pressed to set the camera so that face detection processing will be executed, a face-detection execution mark is displayed at the upper-right corner of a display screen. The user can ascertain that face detection processing will be executed merely by observing the face-detection execution mark. If a face is detected from within the image of a subject, a detection border is displayed so as to enclose the face. When face detection processing is unnecessary, the face detection button is pressed again. Now a face-detection non-execution mark is displayed on the display screen. By observing the face-detection non-execution mark, the user can ascertain that face detection processing will not be executed.

23 Claims, 17 Drawing Sheets

TARGET DETECTING APPARATUS, IMAGE FILE RECORDING APPARATUS AND METHODS OF CONTROLLING SAME

This application is a Divisional of application Ser. No. 11/643,784 filed on Dec. 22, 2006 now abandoned, and for which priority is claimed under 35 U.S.C. §120; and this application claims priority of Application No. 2006-009797 filed in Japan on Dec. 22, 2006 under 35 U.S.C. §119; the entire contents of all are hereby incorporated by reference.

BACKGROUND OF THE INVENTION

1. Field of the Invention

This invention relates to a target detecting apparatus, an image file recording apparatus and methods of controlling the same.

2. Description of the Related Art

Devices such as digital still cameras and printers that detect a target such as a face from within the image of a subject are increasing in number. By detecting a face, correction processing or the like is executed in such a manner that the detected face will appear in attractive fashion (see the specifications of Japanese Patent Application Laid-Open Nos. 2003-107335 and 2003-344891).

However, there are instances where one cannot determine whether or not processing for detecting a target has been set.

SUMMARY OF THE INVENTION

Accordingly, an object of the present invention is to so arrange it that a user can check, in a comparatively simple manner, whether or not processing for detecting a target has been set.

According to a first aspect of the present invention, the foregoing object is attained by providing a target detecting apparatus comprising: a detection processing setting device (means) for setting whether or not processing for detecting a target from within the image of a subject will be executed; a detection processing determination device (means) for determining whether the detection processing setting device has set execution of target detection processing; a target detecting device (means), responsive to a determination by the detection processing determination device that target detection processing will be executed, for executing processing for detecting a target from within the image of a subject represented by applied subject-image data; and a setting notification device (means), responsive to a determination by the detection processing determination device that target detection processing will be executed, for notifying of the fact that execution of target detection processing has been set by the detection processing setting device.

The first aspect of the present invention also provides a control method suited to the above-described target detecting apparatus. Specifically, the first aspect of the present invention provides a method of controlling a target detecting apparatus, comprising the steps of: setting whether or not processing for detecting a target from within the image of a subject will be executed; determining by a detection processing determination circuit whether execution of target detection processing has been set; in response to a determination by the detection processing determination circuit that target detection processing will be executed, executing processing, by a target detecting circuit, for detecting a target from within the image of a subject represented by applied subject-image data; and in response to a determination by the detection processing determination circuit that target detection processing will be executed, notifying of the fact that execution of target detection processing has been set.

In accordance with the first aspect of the present invention, whether or not target detection processing is to be executed is set by a detection processing setting device. If it is determined that execution of target detection processing has been set, then target detection processing is executed in response to this determination. Furthermore, notification is given of the status of the setting regarding execution of target detection processing. Because the user is notified of the status of the setting regarding execution of target detection processing, the user is capable of confirming that target detection processing will or will not be executed. Such notification of the status of the setting regarding execution of target detection processing can be given by display of characters or a mark or by an audio output.

The apparatus may further comprise an image sensing device (means) for sensing the image of a subject. In such case the target detecting device, responsive to a determination by the detection processing determination device that target detection processing will be executed, would execute processing for detecting a target from within the image of a subject represented by subject-image data acquired by the image sensing device. The apparatus may further comprise a first display control device (means) for exercising control to display, on a display screen, the image of the subject represented by the subject-image data acquired by the image sensing device. In such case the setting notification device is a second display control device (means), responsive to a determination by the detection processing determination device that target detection processing will be executed, for exercising control to display, on the display screen on which the image of the subject is being displayed, the fact that execution of target detection processing has been set by the detection processing setting device.

While the image of a subject is being displayed on a display screen, the fact that execution of target detection processing has been set can be displayed on the display screen. The setting of target detection processing can be checked without changing over the image sensing mode. The first display control device and the second display control device may be the same device.

The apparatus may further comprise a result notification device (means), responsive to a determination by the detection processing determination device that target detection processing will be executed, for notifying of result of detection by the target detecting device. For example, by giving notification of a detection result indicating whether or not a target has been detected, the user is capable of ascertaining the result of detection. A detection border can be displayed around a target in accordance with the result of detection. Further, in a case where result of detection is that a target has not been detected despite the fact that it is known that the target exists, the user can verify that target detection processing is not operating normally. The result of detection may be displayed as text or as a mark that differs between detection and non-detection.

The apparatus may further comprise a notification setting device (means) for setting whether notification is to be given of result of detection by the target detecting device; and a result notification device (means), responsive to the fact that notification of result of detection has been set by the notification setting device and, moreover, to a determination by the detection processing determination device that target detection processing will be executed, for notifying of result of detection by the target detecting device.

Notification is given of result of detection in accordance with the setting of the detection result notification device. Whether or not notification of result of detection is to be given can be set.

The apparatus may further comprise a setting method notification device (means), responsive to a determination by the detection processing determination device that execution of target detection processing will be executed, for giving notification of at least one of a setting method for not executing target detection processing and a setting method for executing target detection processing by the target detecting device.

Since the user can ascertain the setting method for not executing target detection processing and the setting method for executing target detection processing, the user can, as necessary, make a setting for not executing target detection and a setting for executing target detection.

In one mode of practicing the invention, the target detecting apparatus further comprises an image sensing device for sensing the image of a subject, wherein the target detecting device, responsive to a determination by the detection processing determination device that target detection processing will be executed, executes processing for detecting a target from within the image of a subject represented by subject-image data acquired by the image sensing device. The apparatus further comprises an image sensing mode setting device (means) for setting a first image sensing mode or a second image sensing mode; a control device (means), responsive to setting of the first image sensing mode by the image sensing mode setting device, for applying control for the first image sensing mode to subject-image data acquired by the image sensing device, and responsive to setting of the second image sensing mode by the image sensing mode setting device, for applying control for the second image sensing mode to subject-image data that has been output from the image sensing device; and a verification notification device (means) for giving notification of at least one of the fact that target detection processing will not be executed, in response to setting of the first image sensing mode by the image sensing mode setting device and, moreover, to a determination by the detection processing determination device that target detection processing will not be executed, and the fact that target detection processing will be executed, in response to setting of the second image sensing mode by the image sensing mode setting device and, moreover, to a determination by the detection processing determination device that target detection processing will be executed.

Notification of whether or not target detection processing will be executed is given in accordance with the image sensing mode. Thus the user can ascertain whether or not target detection processing will be executed. The user is capable of freely changing the setting in response to the notification. In another mode of practicing the invention, the target detecting apparatus further comprises an image sensing device for sensing the image of a subject, wherein the target detecting device, responsive to a determination by the detection processing determination device that target detection processing will be executed, executes processing for detecting a target from within the image of a subject represented by subject-image data acquired by the image sensing device. The apparatus further comprises an image sensing mode setting device (means) for setting a first image sensing mode or a second image sensing mode; a control device (means), responsive to setting of the first image sensing mode by the image sensing mode setting device, for applying control for the first image sensing mode to subject-image data that has been output from the image sensing device, and responsive to setting of the second image sensing mode by the image sensing mode setting device, for applying control for the second image sensing mode to subject-image data that has been output from the image sensing device; and a target detection control device, responsive to setting of the first image sensing mode by the image sensing mode setting device and, moreover, to a determination by the detection processing determination device that target detection processing will not be executed, for controlling the target detecting device in such a manner that target detection processing in the target detecting device will be executed, and responsive to setting of the second image sensing mode by the image sensing mode setting device and, moreover, to a determination by the detection processing determination device that target detection processing will be executed, for controlling the target detecting device in such a manner that target detection processing in the target detecting device will be halted.

In the case of the first image sensing mode, such as a case where executing target detection processing will be effective, target detection processing is executed. In the case of the second image sensing mode, such as a case where executing target detection processing will not be very effective, target detection processing is not executed. Thus, whether target detection processing is executed or not is controlled in accordance with the image sensing mode.

By way of example, the target to be detected is a face of a person. In this case, the first image sensing mode is one that assumes that a person is the main subject, as is the case in a portrait mode or sports mode. The second image sensing mode is one assumes that something other than a person is the main subject, as is the case in a scenery mode or night-scene mode.

The target detecting apparatus may operate on power provided by a battery. In such case the apparatus would preferably further comprise a residual-capacity determination device (means) for determining whether residual capacity of the battery has fallen below a predetermined threshold value; and a target detection control device, responsive to a determination by the residual-capacity determination device that residual capacity of the battery has fallen below the predetermined threshold value and, moreover, to a determination by the detection processing determination device that target detection processing will be executed, for halting target detection processing in the target detecting device. Target detection processing is halted if residual battery capacity declines. This makes it possible to suppress power consumption in a battery having a small residual capacity.

The apparatus may further comprise a halt notification device (means) for notifying of the fact that the target detection processing has halted or of the fact that a setting in the detection processing setting device is inappropriate, in accordance with halt control in the target detection control device.

Thus the user can ascertain that target detection processing has halted despite the fact that a setting has been made so as to execute target detection processing, or that detection processing is inappropriate In a further mode of practicing the invention, the target detecting apparatus further comprises an image sensing device for sensing the image of a subject, wherein the target detecting device, responsive to a determination by the detection processing determination device that target detection processing will be executed, executes processing for detecting a target from within the image of a subject represented by subject-image data acquired by the image sensing device. The apparatus further comprises a flash light-emission setting device (means) for setting a flash light-emission mode; a flash light-emission control device (means), responsive to setting of the flash light-emission mode by the flash light-emission setting device; for controlling a flash light-emission unit so as to flash-illuminate a subject whose image is sensed by the image sensing device; a target detection control device, responsive to setting of the flash light-emission mode by the flash light-emission setting device and, moreover, to a determination by the detection processing determination device that target detection processing will not be executed, for controlling the target detecting device in such a manner that target detection processing in the target detecting device will be executed; and an execution notification device (means) for notifying of the fact that the target detection processing will be executed or of the fact that a setting in the detection processing setting device is inappropriate, in accordance with control exercised by the target detection control device.

In cases where a flash is fired, often the subject is a person. If the image of a person is sensed, face detection processing is executed and the face of the person is detected even if a setting is not made by the user. By virtue of the notification, the user can ascertain that face detection processing will be executed or the fact that the user setting is inappropriate, irrespective of the setting made by the user.

In a further mode of practicing the invention, the target detecting apparatus further comprises an image sensing device for sensing the image of a subject, wherein the target detecting device, responsive to a determination by the detection processing determination device that target detection processing will be executed, executes processing for detecting a face as a target from within the image of a subject represented by subject-image data acquired by the image sensing device. The apparatus further comprises an image sensing mode setting device (means) capable of setting an image sensing mode, such as a portrait mode or sports mode, which assumes that a person is a main subject; and a control device (means), responsive to setting by the image sensing mode setting device of an image sensing mode that assumes a person is the main subject, for controlling the target detecting device in such a manner that target detection processing will be executed.

Thus, when a portrait image sensing mode is in effect, face detection processing is executed irrespective of a user setting.

In a further mode of practicing the invention, the target detecting apparatus further comprises an image sensing device for sensing the image of a subject, wherein the target detecting device, responsive to a determination by the detection processing determination device that target detection processing will be executed, executes processing for detecting a face as a target from within the image of a subject represented by subject-image data acquired by the image sensing device. The apparatus further comprises an image sensing mode setting device (means) capable of setting an image sensing mode, such as a scenery mode or night-scene mode, which assumes that something other than a person is a main subject; and a control device (means), responsive to setting by the image sensing mode setting device of an image sensing mode that assumes something other than a person is the main subject, for controlling the target detecting device in such a manner that target detection processing is halted.

Thus, when a scenery image sensing mode is in effect, face detection processing is halted irrespective of a user setting.

In a further mode of practicing the invention, the target detecting apparatus further comprises an image sensing device for sensing the image of a subject, wherein the target detecting device, responsive to a determination by the detection processing determination device that target detection processing will be executed, executes processing for detecting a face as a target from within the image of a subject represented by subject-image data acquired by the image sensing device. The apparatus further comprises a flash light-emission control device (means) for controlling a flash light-emission unit so as to flash-illuminate a subject whose image is sensed by the image sensing device; and a control device (means), responsive to execution of a flash light-emission that is based upon the flash light-emission control device, for controlling the target detecting device in such a manner that target detection processing will be executed.

In cases where a flash is fired, often the subject is a person. When a flash light-emission is performed, processing in which a face is detected is executed irrespective of the user setting.

The apparatus may further comprise a flash light-emission setting device (means) for setting a flash light-emission mode. In this case the flash light-emission control device, responsive to setting of the flash-light emission mode by the flash light-emission setting device, controls a flash light-emission unit so as to perform a flash light-emission.

Thus, face detection processing is executed even in a case where the flash light-emission mode has been set by the user.

The apparatus may further comprise a flash-off setting device for forcibly turning off a flash light-emission. The flash light-emission control device would turn off the flash light-emission in response to setting of flash turn-off by the flash-off setting device. The apparatus further comprises a halt control device (means) for controlling the target detecting device so as to turn off target detection processing in accordance with the flash-off setting by the flash-off setting device.

Thus, face detection processing is halted by turning off the flash light-emission.

According to a second aspect of the present invention, the foregoing object is attained by providing a target detecting apparatus comprising: a target detecting device (means) for executing processing for detecting a target from within the image of a subject represented by applied subject-image data; a control setting device for setting whether to control the target detecting device using target data representing the target detected by the target detecting device; a set-state determination device (means) for determining whether the control setting device has set control of the target detecting device; and a control device (means) for controlling the target detecting device using the target data in response to a determination by the set-state determination device that control of the target detecting device has been set.

The second aspect of the present invention also provides a control method suited to the above-described target detecting apparatus. Specifically, the second aspect of the present invention provides a method of controlling a target detecting apparatus comprising the steps of: executing processing by a target detecting circuit for detecting a target from within the image of a subject represented by applied subject-image data; setting whether to control the target detecting device using target data representing the target detected by the target detecting circuit; determining by a set-state determination circuit whether control of the target detecting device has been set; and controlling the target detecting device by a control circuit using the target data in response to a determination by the set-state determination circuit that control of the target detecting device has been set.

In accordance with the second aspect of the present invention, whether a target detecting device is controlled using target data representing a detected target can be set.

According to a third aspect of the present invention, the foregoing object is attained by providing a target detecting apparatus comprising: a target detecting device (means) for detecting a target from within the image of a subject represented by applied subject-image data; a subject-image display control device (means) for controlling a display device so as to display the image of the subject on a display screen; a detection-border display setting device (means) for setting whether a detection border, which specifies a target detected by the target detecting device, will be displayed on the image of the subject being displayed based upon control by the subject-image display control device; and a detection-border display control device (means), responsive to setting of display of a detection border by the detection-border display setting device, for controlling the display device so as to display the detection border on the display screen.

The third aspect of the present invention also provides a control method suited to the above-described target detecting apparatus. Specifically, the third aspect of the present invention provides a method of controlling a target detecting apparatus, comprising the steps of: detecting a target from within the image of a subject, which is represented by applied subject-image data, by a target detecting circuit; controlling a display device by a subject-image control circuit so as to display the image of the subject on a display screen; setting whether a detection border, which specifies a target detected by the target detecting device, will be displayed on the image of the subject being displayed based upon control by the subject-image display control circuit; and in response to setting of display of a detection border, controlling the display device by a border-detection display setting circuit so as to display the detection border on the display screen.

In accordance with the third aspect of the present invention, whether a detection border indicating a target is displayed or not can be set. If the detection border has been set, the detection border is displayed in response to detection of a target.

According to a fourth aspect of the present invention, the foregoing object is attained by providing an image file recording apparatus comprising: a detection processing setting device (means) for setting whether or not processing for detecting a target from within the image of a subject will be executed; a detection processing determination device (means) for determining whether the detection processing setting device has set execution of target detection processing; a target detecting device (means), responsive to a determination by the detection processing determination device that target detection processing will be executed, for executing processing for detecting a target from within the image of a subject represented by applied subject-image data; and a writing device (means) for writing, to the same image file, the subject-image data that has been subjected to processing that is based upon the target detected by the target detecting device, and data indicating that target detection processing has been set by the detection processing setting device.

The fourth aspect of the present invention also provides a control method suited to the above-described image file recording apparatus. Specifically, the fourth aspect of the present invention provides a method of controlling a image file recording apparatus comprising the steps of: setting whether or not processing for detecting a target from within the image of a subject will be executed; determining by a detection processing determination circuit whether execution of target detection processing has been set; in response to a determination by the detection processing determination circuit that target detection processing will be executed, executing processing, by a target detecting circuit, for detecting a target from within the image of a subject represented by applied subject-image data; and writing, to the same image file by an image file writing device, the subject-image data that has been subjected to processing that is based upon the target detected by the target detecting circuit, and data indicating that target detection processing has been set by the detection processing setting circuit.

In accordance with the fourth aspect of the present invention, whether or not processing for detecting a target from within the image of a subject is to be executed is set. Target detection processing is executed in response to a determination that execution of target detection processing has been set. Subject-image data that has been subjected to processing that is based upon the detected target and data indicating that execution of target detection processing has been set is written to the same image file.

In a case where data indicating that execution of target detection processing has been set has been written to an image file, the fact that the target-image data that has been written to the image file is data has been subjected to processing that is based upon the detected target is decided in advance. As a result, when playback is performed, the user can ascertain the fact that the subject-image data that has been written to the image file has been subjected to processing that is based upon the detected target.

The writing device may further write data indicating the result of detection by the target detecting device to the same image file. By checking the result of detection, the user can verify in which part of the image of the subject a target exists. Examples of results of detection are the position (center position) of a target (face or eyes, etc.), number of target images, size, orientation, inclination, score indicating how target-like the target image, and target brightness, etc.

According to a fifth aspect of the present invention, the foregoing object is attained by providing an image file recording apparatus comprising: a detection processing setting device (means) for setting whether or not processing for detecting a target from within the image of a subject will be executed; a detection processing determination device (means) for determining whether the detection processing setting device has set execution of target detection processing; a target detecting device (means), responsive to a determination by the detection processing determination device that target detection processing will be executed, for executing processing for detecting a target from within the image of a subject represented by applied subject-image data; and a writing device (means) for writing, to the same image file, the subject-image data, data indicating that target detection processing has been set by the detection processing setting device, and data indicating result of detection by the target detecting device.

The fifth aspect of the present invention also provides a control method suited to the above-described image file recording apparatus. Specifically, the fifth aspect of the present invention provides a method of controlling an image file recording apparatus, comprising the steps of: setting whether or not processing for detecting a target from within the image of a subject will be executed; determining by a detection processing determination circuit whether execution of target detection processing has been set; in response to a determination by the detection processing determination circuit that target detection processing will be executed, executing processing, by a target detecting circuit, for detecting a target from within the image of a subject represented by applied subject-image data; and writing, to the same image file by an image file writing device, the subject-image data, data indicating that target detection processing has been set, and data indicating result of detection by the target detecting circuit.

In accordance with the fifth aspect of the present invention, whether or not processing for detecting a target from within the image of a subject is to be executed is set. Target detection processing is executed in response to a determination that execution of target detection processing has been set. Subject-image data (this may be data that has been processed based upon a detected target or subject-image data that has not undergone such processing), data indicating that execution of target detection processing has been set and data indicating result of detection is written to the same image file.

In a case where data representing the image of a subject is reproduced, in which part of the image of the subject the target exists can be checked from the data indicating the result of detection.

Furthermore, it is possible to perform trimming processing or display of a border using the data indicating result of detection as a reference even in a computer or printer that is not equipped with processing for detecting a subject. Further, it is possible to execute various image processing such as a brightness correction, color correction, noise suppression and contour enhancement using the data indicating result of detection as a reference. It should be noted that the image processing executed here may be processing applied to the entire screen or local processing executed with regard to a detected target (inclusive of portions peripheral to the detected target).

In a case where subject-image data that has been recorded has been made to reflect the result of subject detection, characteristic values and parameters, etc., that prevailed when the result of subject detection was reflected in the subject-image data may also be written to the same file.

According to a sixth aspect of the present invention, the foregoing object is attained by providing an image file recording apparatus comprising: a detection processing setting device (means) for setting whether or not processing for detecting a target from within the image of a subject will be executed; a detection processing determination device (means) for determining whether the detection processing setting device has set execution of target detection processing; a target detecting device (means), responsive to a determination by the detection processing determination device that target detection processing will be executed, for executing processing for detecting a target from within the image of a subject represented by applied subject-image data; and a writing device (means), responsive to a determination by the detection processing determination device that target detection processing will not be executed, for writing, to the same image file, the subject-image data and data indicating that target detection processing has not been executed.

The sixth aspect of the present invention also provides a control method suited to the above-described image file recording apparatus. Specifically, the sixth aspect of the present invention provides a method of controlling an image file recording apparatus, comprising the steps of: setting whether or not processing for detecting a target from within the image of a subject will be executed; determining by a detection processing determination circuit whether execution of target detection processing has been set; in response to a determination by the detection processing determination circuit that target detection processing will be executed, executing processing, by a target detecting circuit, for detecting a target from within the image of a subject represented by applied subject-image data; and in response to a determination by the detection processing determination circuit that target detection processing will not be executed, writing, to the same image file by an image file writing device, the subject-image data and data indicating that target detection processing has not been executed.

In accordance with the sixth aspect of the present invention, data indicating that target detection processing has not been executed is written to an image file. As a result, the user can ascertain that target detection processing has not been subjected to subject-image data that has been written to the image file. Target detection processing can be executed when the subject-image data is reproduced.

The image file recording apparatus may operate based upon power supplied by a battery. In this case, the apparatus further comprises a residual-capacity detecting device (means) for detecting residual capacity of the battery. The writing device would write data, which represents the residual capacity detected by the residual-capacity detecting device, to the same image file.

According to a seventh aspect of the present invention, the foregoing object is attained by providing an image file recording apparatus comprising: a first display control device (means) for exercising control to display, on a display screen, the image of a subject represented by applied subject-image data; a target detecting device for executing processing for detecting a target from within the image of a subject represented by the subject-image data; a detection-border display setting device (means) for setting whether a detection border, which specifies a target detected by the target detecting device, will be displayed on the display screen; a second display control device (means) for controlling the display device so as to display a detection border on the display screen in accordance with a setting made by the detection-border display setting device; and a writing device (means) for writing the subject-image data and data indicating the setting by the detection-border display setting device in the same image file.

The seventh aspect of the present invention also provides a control method suited to the above-described image file recording apparatus. Specifically, the seventh aspect of the present invention provides a method of controlling an image file recording apparatus, comprising the steps of: controlling a display device by a first display control circuit in such a manner that the image of a subject represented by applied subject-image data is displayed on a display screen; executing processing by a target detecting circuit for detecting a target from within the image of a subject represented by the subject-image data; setting whether a detection border, which specifies a target detected by the target detecting device, will be displayed on the display screen; in accordance with a setting made by the detection-border display setting processing, controlling the display device by a second display control circuit so as to display a detection border on the display screen; and writing the subject-image data and data indicating the setting by the detection-border display setting processing in the same image file by an image file writing device.

In accordance with the seventh aspect of the present invention, a setting as to whether a detection border will be displayed can be made. If a setting for displaying a detection border has been made, a target detected from within the image of a subject is specified by the detection border. Data indicating the setting of the detection border and subject-image data is written to the same image file. By checking data indicating the setting of the detection border at the time of playback, the user can ascertain the status of the setting of display of the detection border at the recording of subject-image data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
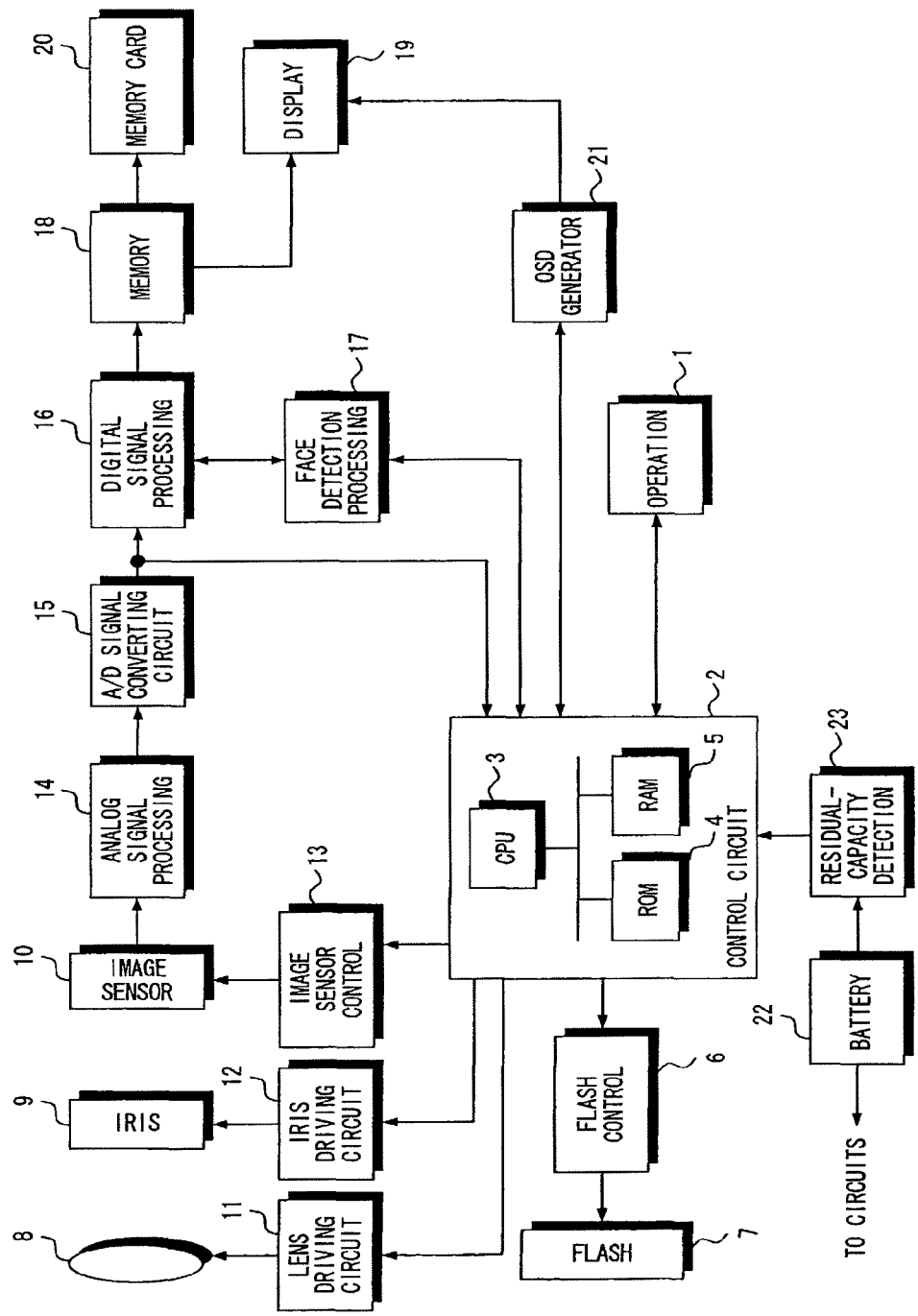
FIG. 1 is a block diagram illustrating the electrical structure of a digital still camera according to an embodiment of the present invention.

FIG. 1, which illustrates an embodiment of the invention, is a block diagram illustrating the electrical structure of a digital still camera.

The overall operation of the digital still camera is controlled by a control circuit 2. The latter includes a CPU 3, a ROM 4 in which the operating program of the digital still camera, the operation of which will be described later, has been stored, and a RAM 5 for storing data and the like temporarily.

The digital still camera includes operating buttons 1 such as a shutter-release button of two-step stroke type, and a mode setting switch. Operating signals that are output from the operating buttons 1 are input to the control circuit 2. The digital still camera is further provided with a flash unit 7 controlled by a flash control circuit 6.

If an image sensing mode is set by the mode setting switch, light flux is converged by an imaging lens 8 controlled by a lens driving circuit 11. A light beam representing the image of the subject impinges upon the photoreceptor surface of an image sensor 10 via an iris 9 controlled by an iris driving circuit 12. The image of a subject is formed on the photoreceptor surface of the image sensor 10. The latter is controlled by a control circuit 13 for controlling the image sensing device so that a video signal representing the image of the subject (a so-called "thru-image signal" representing a "thru-image") will enter an analog signal processing circuit 14 at fixed image sensing periods (this is preliminary image sensing). The analog signal processing circuit 14 executes prescribed analog signal processing such as correlated double sampling. The video signal that is output from the analog signal processing circuit 14 is converted to digital image data and input to a digital signal processing circuit 16 by an analog/digital converting circuit 15. The digital signal processing circuit 16 executes prescribed signal processing such as a gamma correction and white balance adjustment. Image data that is output from the digital signal processing circuit 16 is applied to a display unit 19 via a memory 18. The image of the subject obtained by image sensing is displayed on the display screen of the display unit 19.

If the shutter-release button is pressed through the first step of its stroke, the image data that has been output from the analog/digital converting circuit 15 is applied to a face detection processing circuit 17. The latter detects a face from within the image of the subject represented by the input image data. The imaging lens 8 position so as to bring the detected face into focus. The f-stop number of the iris 9 and the shutter speed of the image sensor 10 are controlled in such a manner that the detected face will take on the appropriate brightness.

If the shutter-release button is pressed through the second step of its stroke, the image data that has been output from the digital signal processing circuit 16 is applied to and stored temporarily in memory 18, as described above. The image data is output from the memory 18 and recorded on a memory card 20.

As will be described in detail later, the digital still camera according to this embodiment is such that the operating buttons 1 include a face button for allowing the user to set whether face detection processing is or is not to be executed. A mark for alerting the user of the fact that the face button has been pressed and that face detection processing will or will not be executed is displayed on the display screen of the display unit 19. In order to display the mark, the digital still camera is provided with an OSD (on-screen device) generating circuit 21. The output signal from the OSD generating circuit 21 is applied to the display unit 19.

The digital still camera according to this embodiment operates based upon electric power supplied by a battery (which may or may not be removable) 22. The residual capacity of the battery 22 is detected by a residual-capacity detecting circuit 23. Data indicating the residual capacity detected is input to the control circuit 2.

Figure 2:
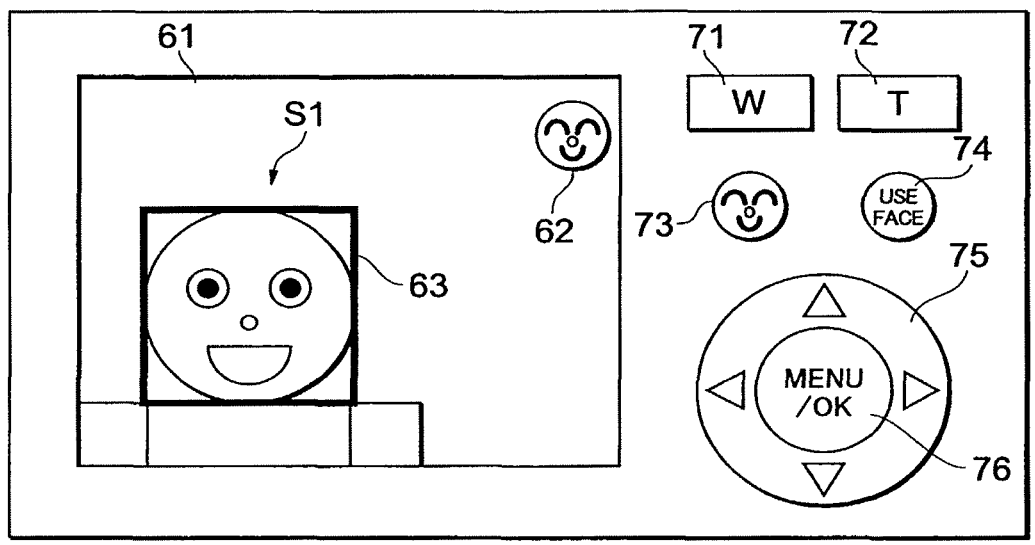
FIG. 2 illustrates the back side of the digital still camera according to this embodiment.
Figure 3:
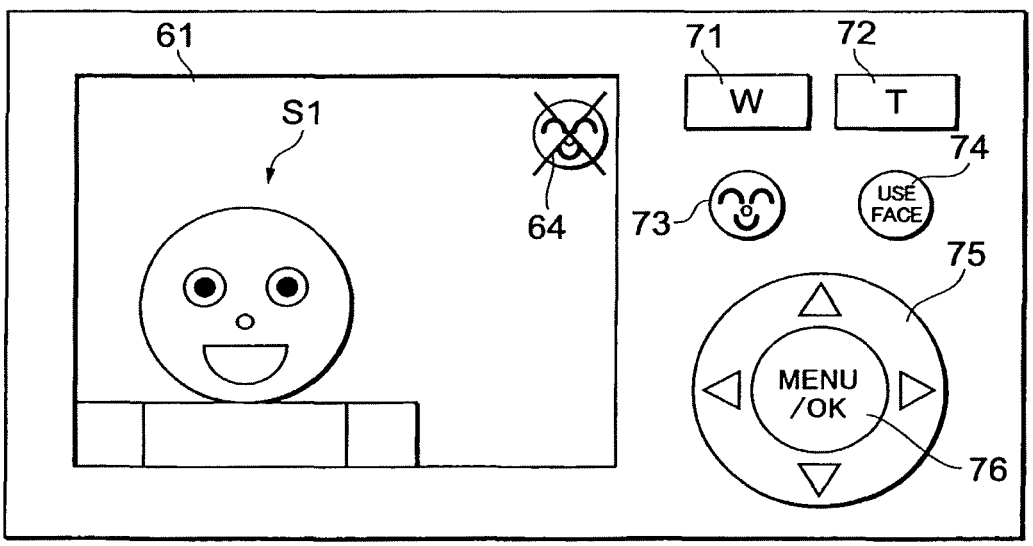
FIG. 3 illustrates the back side of the digital still camera according to this embodiment.

FIGS. 2 and 3 illustrate the back side of the digital still camera.

FIG. 2 illustrates the appearance of the back side of the camera when the user has set the camera so as to execute face detection processing.

A display screen 61 has been formed on the back side of the digital still camera so as to occupy substantially the entire surface thereof. A wide-angle button 71 and a telephoto button 72 are provided at the upper-right side of the display screen. The above-mentioned face button, indicated at 73, is provided below the wide-angle button 71. A use-face button 74 is provided below the telephoto button 72. The use-face button 74 is pressed in a case where AF (autofocus control) processing, AE (automatic exposure control) processing and other processing is to be executed using a face detected in face detection processing. A ring-shaped up, down, left, right button 75 formed in such a manner that arrows can be pressed in four directions is provided below the buttons 73 and 74. A menu/OK button 76 is formed at the center of the up, down, left, right button 75. A menu for setting parameters and the like is displayed on the display screen 61 by pressing the menu/OK button 76. A cursor within the menu is moved by pressing any arrow of the up, down, left, right button 75. A parameter or the like at which the cursor is situated is set by pressing the menu/OK button 76 again.

If the face button 73 is utilized to make a setting in such a manner that face detection processing will be executed, a face-detection execution mark 62 having the shape of a face is displayed at the upper-right corner of the display screen 61 on which a subject image S1 is being displayed. By checking the face-detection execution mark 62, the user can ascertain the fact that execution of face detection processing has been set. If the fact that the subject image S1 contains the image of a face is detected by execution of face detection processing, a detection border 63 is displayed so as to enclose (indicate) the face portion. The user can verify the fact that the image within the detection border 63 has been detected as the image of a face as a result of face detection processing.

In the example set forth above, the face button 73 and use-face button 74 are assumed to be separate buttons. However, both functions can also be performed by a single button that applies the command based upon the face button 73 and the command based upon the use-face button 74. In a case where such a single dual-purpose button is used, face detection processing would be executed and, moreover, AF processing and AE processing would be executed using the detected face by pressing the dual-purpose button.

FIG. 3 illustrates the appearance of the back side of the camera when the user has set the camera so as not to execute face detection processing.

If face detection processing is not to be executed, a face-detection non-execution mark 64 is displayed at the upper-right corner of the display screen 61 on which the subject image S1 is being displayed. The face-detection non-execution mark 64 is the one that X sign is piled up to the face-detection execution mark 62. By observing the face-detection non-execution mark 64, the user can ascertain the fact that face detection processing will not be executed. It goes without saying that since face detection processing is not executed, a detection border is not displayed even though the subject image S1 contains a face.

Figure 4:
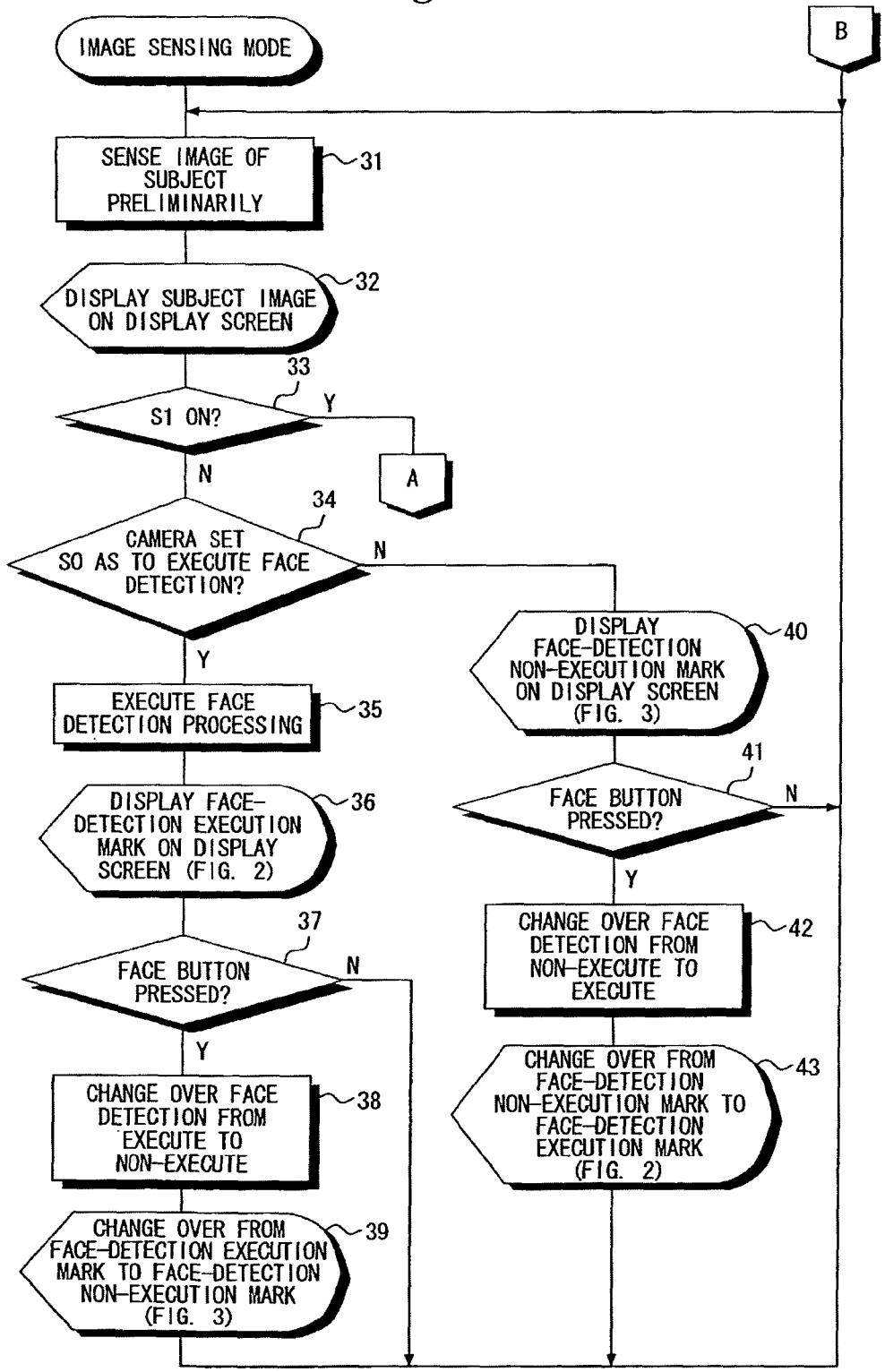
FIG. 4 is a flowchart illustrating part of processing for image sensing according to this embodiment.
Figure 5:
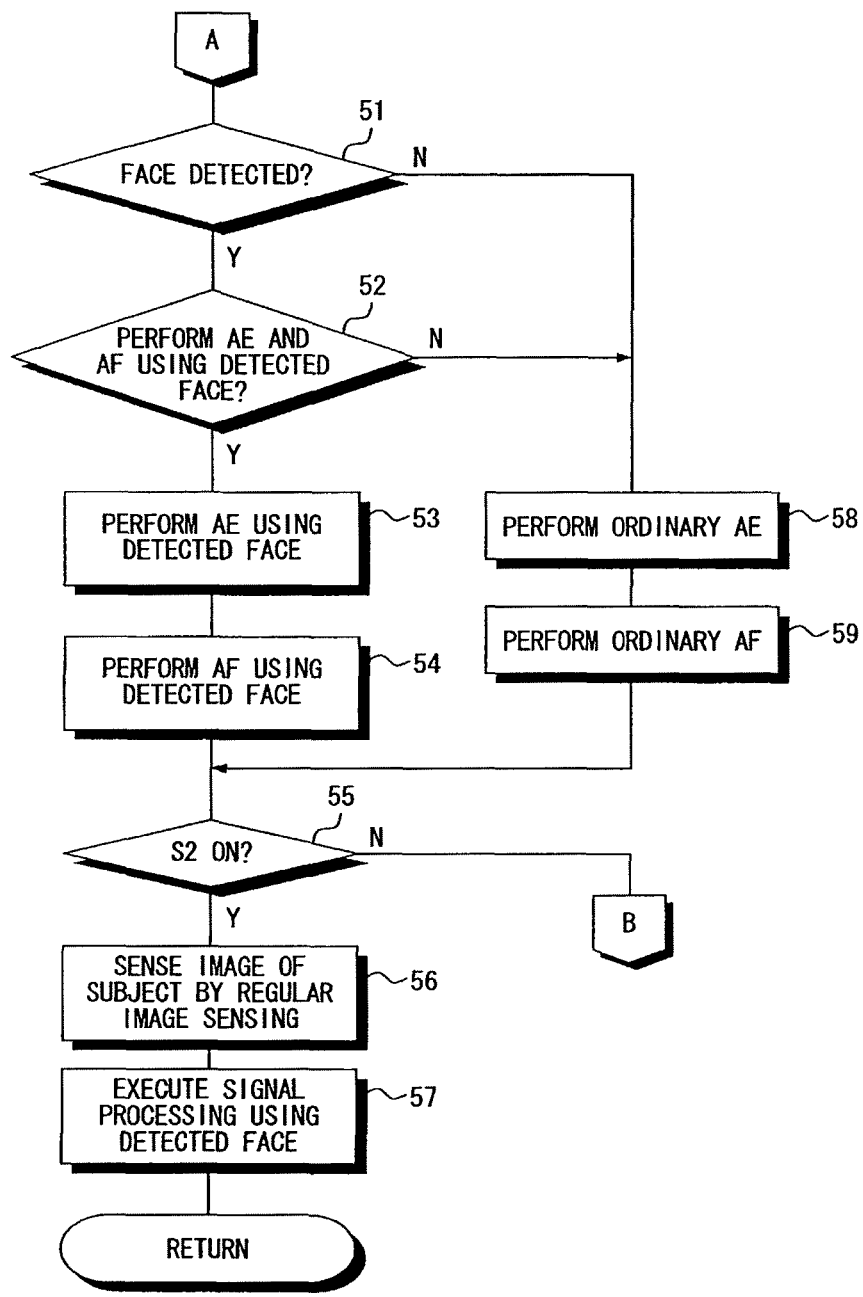
FIG. 5 is a flowchart illustrating part of processing for image sensing according to this embodiment.

FIGS. 4 and 5 are flowcharts illustrating processing in the image sensing mode.

If the image sensing mode is set, the image of the subject is sensed (preliminary image sensing is performed) (step 31) and the image of the subject is displayed on the display screen 61 of the display unit 19 (step 32).

If the shutter-release button is not pressed through the first step of its stroke ("NO" at step 33), whether a setting has been made so as to execute face detection is checked (step 34). If execution of face detection has been set ("YES" at step 34), then processing is executed to detect a face from within the image of the subject obtained by preliminary image sensing (step 35). Further, in order to notify the user of the fact that execution of face detection has been set, the face-detection execution mark 62 is displayed on the display screen 61 in the manner illustrated in FIG. 2 (step 36).

If the user considers that face detection processing is unnecessary, then the user presses the face button 73 ("YES" at step 37). When this is done, a changeover is made from a state in which execution of face detection processing has been set to a state in which non-execution has been set (step 38). Further, a changeover is made in such a manner that the face-detection non-execution mark 64 will be displayed instead of the face-detection execution mark 62 (step 39). Owing to display of the face-detection non-execution mark 64, the user can verify that face detection processing will no longer be executed.

When the camera has not been set to execute face detection ("NO" at step 34) in a state in which the shutter-release button has not been pressed through the first step of its stroke ("NO" at step 33), the face-detection non-execution mark 64 is displayed on the display screen in the manner shown in FIG. 3 (step 40). In order to cause execution of face detection processing, the face button 73 is pressed by the user ("YES" at step 41). When this is done, a changeover is made from a state in face detection processing is not executed to a state in which it is executed (step 42). Furthermore, a changeover is made from display of the face-detection non-execution mark 64 to display of the face-detection execution mark 62 (step 43).

If the shutter-release button has been pressed through the first step of its stroke ("YES" at step 33), whether or not a face has been detected is checked (step 51). If a face has been detected ("YES" at step 51), then whether execution of AE processing and AF processing using the detected face has been set is verified (step 52). It goes without saying that this verification is performed based upon whether or not the use-face button 74 has been pressed, as described above.

If the camera has been set so as to execute AE processing and AF processing using the detected face ("YES" at step 52), then the f-stop number and shutter speed are decided in such a manner that the brightness of the detected face will take on the appropriate brightness (step 53). In addition, the imaging lens 8 is positioned so as to bring the detected face into focus (step 54). If the camera has been set so as not to execute AE processing and AF processing using the detected face ("NO" at step 52), or if a face has not been detected ("NO" at step 51), then ordinary AE processing (step 58) and ordinary AF processing (step 59) are executed. Ordinary AE processing is processing whereby the overall subject takes on a prescribed brightness, by way of example. Ordinary AF processing is processing whereby the center of the image sensing zone is brought into focus, by way of example.

If the shutter-release button is pressed through the second step of its stroke within a fixed period of time following pressing of the button through the first step of its stroke ("YES" at step 55), then the image of the subject is sensed again (regular image sensing is performed) (step 56) and subject-image data representing the image of the subject is obtained. The subject-image data obtained is subjected to signal processing based upon image data representing the detected face (step 57). For example, a color correction is performed in such a manner that the face portion of the image will take on an attractive color. The subject-image data that has undergone signal processing is recorded on the memory card 20.

The embodiment described above is such that the face-detection execution mark 62 is displayed in a case where face detection processing is executed, whereas the face-detection non-execution mark 64 is displayed in a case where face detection processing is not executed. However, it may be so arranged that instead of displaying such marks, text is displayed or a voice output produced. It goes without saying that if a voice output is produced, then the digital still camera is provided with a speaker. Further, it may be so arranged that the face-detection execution mark 62 is displayed when face detection processing is executed, whereas when face detection processing is not executed, the face-detection non-execution mark 64 is not displayed and neither is the face-detection execution mark 62.

Further, it may be so arranged that in a case where a plurality of faces have been detected in face detection processing, detection borders are displayed around all of the plurality of faces respectively or a detection border is displayed around any one face.

Furthermore, it may be so arranged that the use-face button 74 is not provided and the setting of AE processing and AF processing, etc., using a face is performed from various menus utilizing the menu/OK button 76. Further, it may be so arranged that both the face button 73 and use-face button 74 are used conjointly with other buttons or the like, and it may be so arranged that execution or non-execution of face detection processing is set by a prescribed sound or voice by providing a voice recognition circuit.

Figure 6:
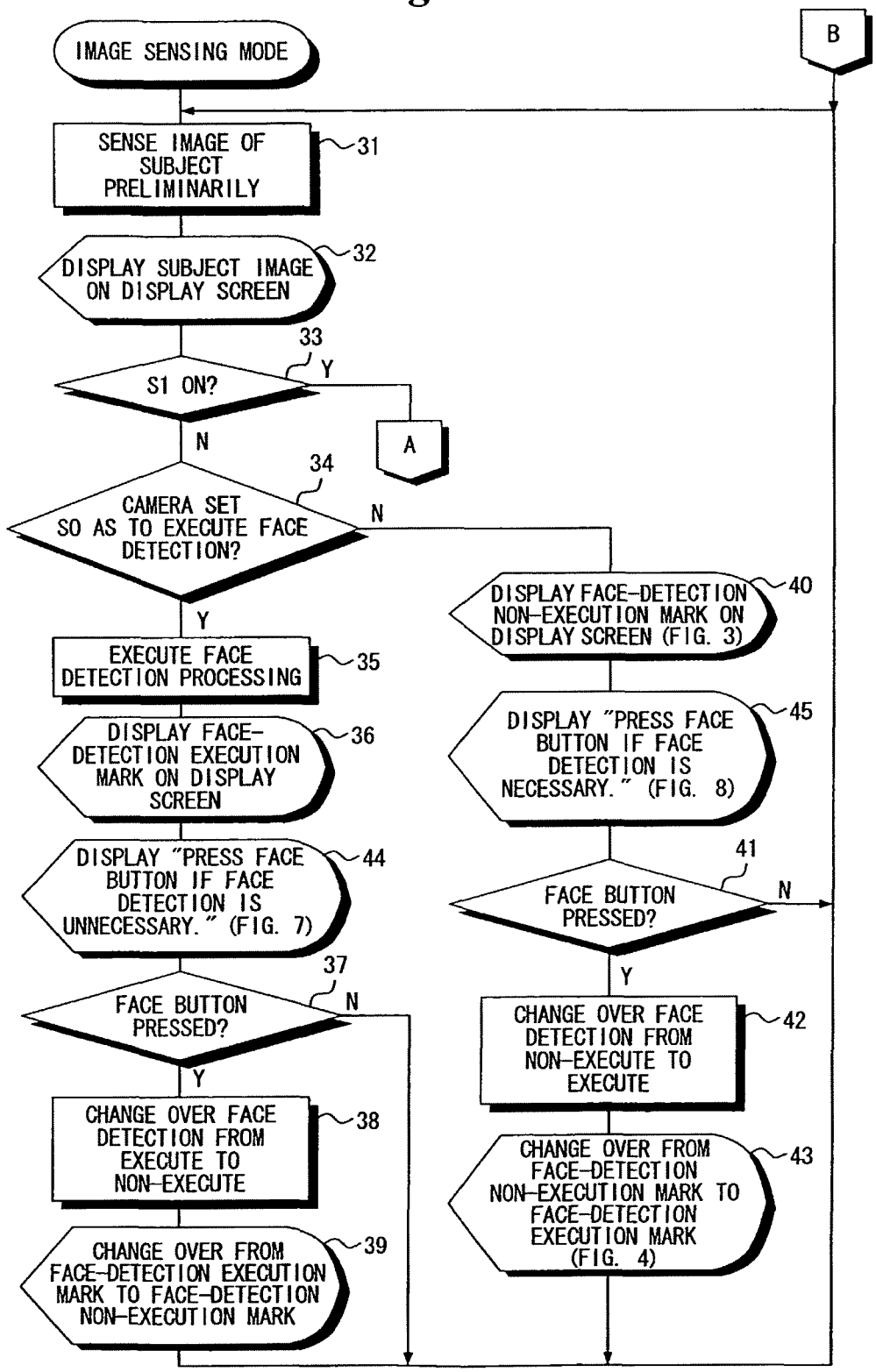
FIG. 6 is a flowchart illustrating part of processing for image sensing according to another embodiment of the present invention.
Figure 7:
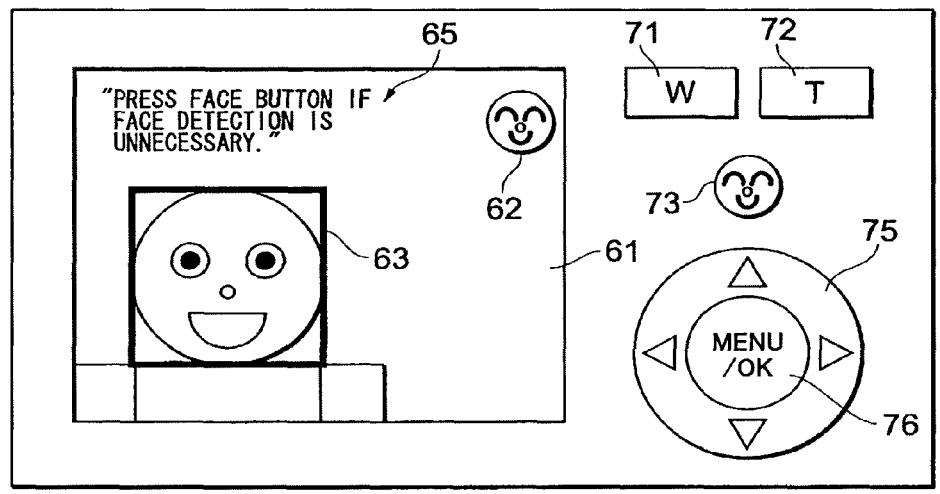
FIG. 7 illustrates the back side of a digital still camera according to this embodiment.
Figure 8:
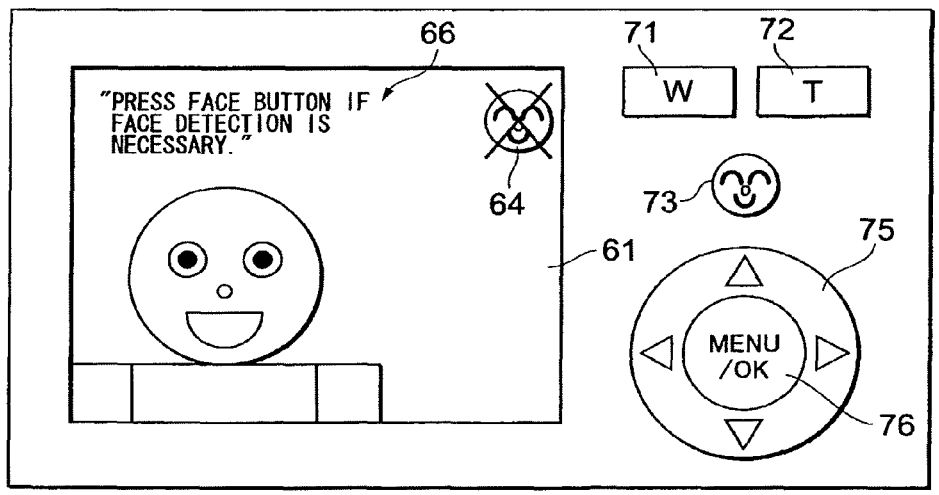
FIG. 8 illustrates the back side of the digital still camera according to this embodiment.

FIGS. 6 to 8 illustrate another embodiment.

FIG. 6 is a flowchart illustrating processing in the image sensing mode. This corresponds to the flowchart shown in FIG. 4. Processing in FIG. 6 identical with that shown in FIG. 4 is identified by like step numbers and need not be described again. FIGS. 7 and 8 illustrate the back side of a digital still camera. Components in FIGS. 7 and 8 identical with those shown in FIG. 2 or 3 are designated by like reference characters and need not be described again.

This embodiment is such that the user is notified of a method of setting the camera so that face detection processing will not be executed when face detection processing is unnecessary in a case where face detection processing has been set, and of a method of setting the camera so that face detection processing will be executed when face detection processing is necessary in a case where face detection processing has not been set.

If the camera has been set to execute face detection processing ("YES" at step 34), a text message 65 reading "PRESS FACE BUTTON IF FACE DETECTION IS UNNECESSARY." is displayed above the display screen 61, as illustrated in FIG. 7 (step 44). By viewing the message 65, the user can readily ascertain that the face button 73 should be pressed to set the camera so that face detection processing will not be executed. By pressing the face button 73, the camera is set to that face detection processing will not be executed (step 38).

If the camera has been set so that face detection processing will not be executed ("NO" at step 34), a text message 66 reading "PRESS FACE BUTTON IF FACE DETECTION IS NECESSARY." is displayed above the display screen 61, as illustrated in FIG. 8 (step 45). By viewing the message 66, the user can readily ascertain that the face button 73 should be pressed to set the camera so that face detection processing will be executed. By pressing the face button 73, the camera is set to that face detection processing will be executed (step 42).

Thus, methods of setting execution or non-execution of face detection processing can be ascertained at a glance.

Figure 9:
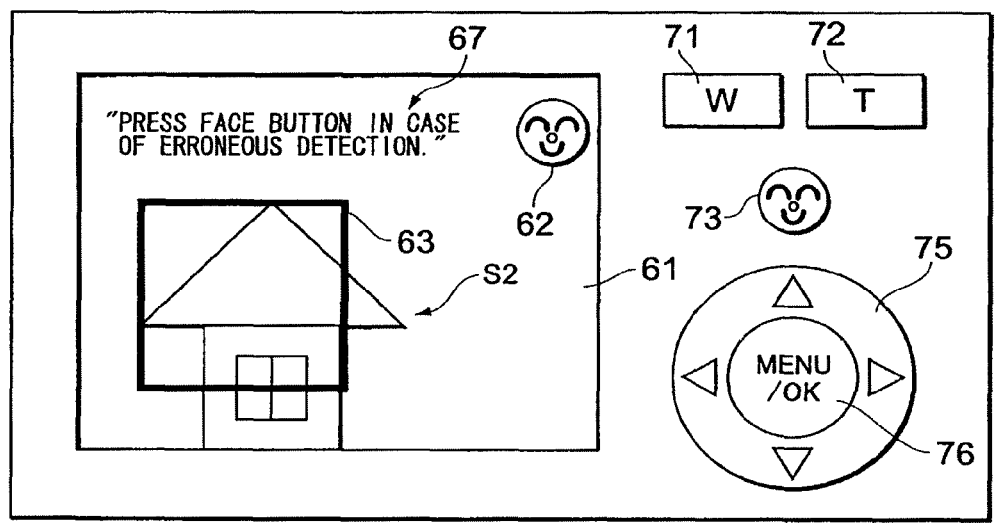
FIG. 9 illustrates the back side of a digital still camera according to a modification.
Figure 10:
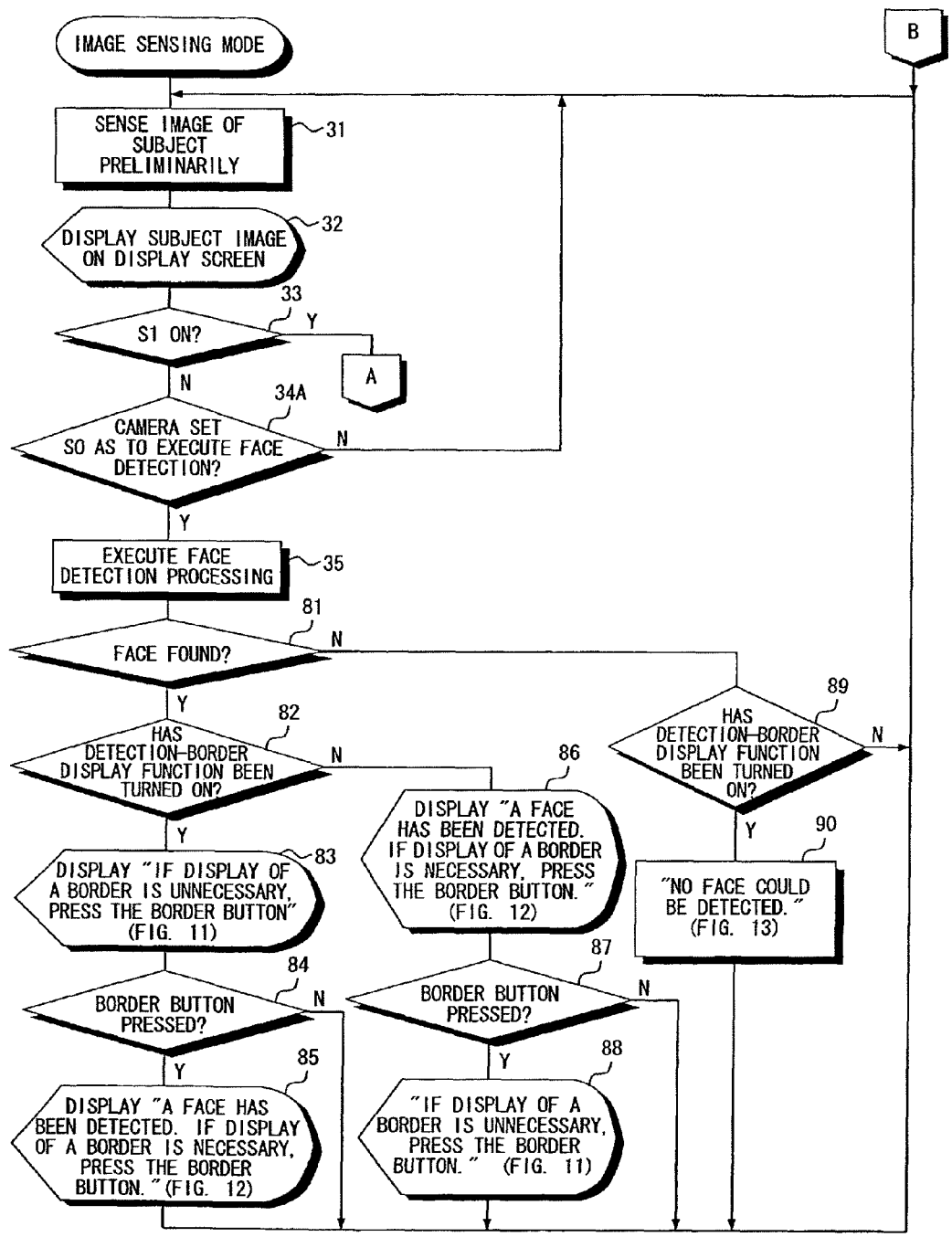
FIG. 10 is a flowchart illustrating part of processing for image sensing according to another embodiment of the present invention.

FIG. 9 illustrates a modification. Components in FIG. 9 identical with those shown in FIG. 2 are designated by like reference characters and need not be described again.

Here a text message 67 reading "PRESS FACE BUTTON IN CASE OF ERRONEOUS DETECTION." is being displayed above the display screen 61.

It is conceivable that as a result of execution of face detection processing with regard to a subject image S2 being displayed on the display screen 61, a face will be detected and the detection border 63 displayed regardless of the fact that the image does not contain a face. It is preferred that the camera be set in such a manner that face detection processing not be executed in a case where the image of a subject does not contain a face and erroneous detection is obvious. According to this modification, therefore, the user is notified by the message 67 of the method of setting the camera in such a manner that face detection processing will not be executed in case of erroneous detection. In a manner similar to that described above, if the face button 73 is pressed in a case where the camera has been set in such a manner that face detection processing will be executed, the camera is set in such a manner that face detection processing will not be executed.

Of course, it may be so arranged that the user can set display or non-display of text messages 65, 66 or 67, which informs the user of the method of setting execution or non-execution of face detection processing, as described above.

Figure 11:
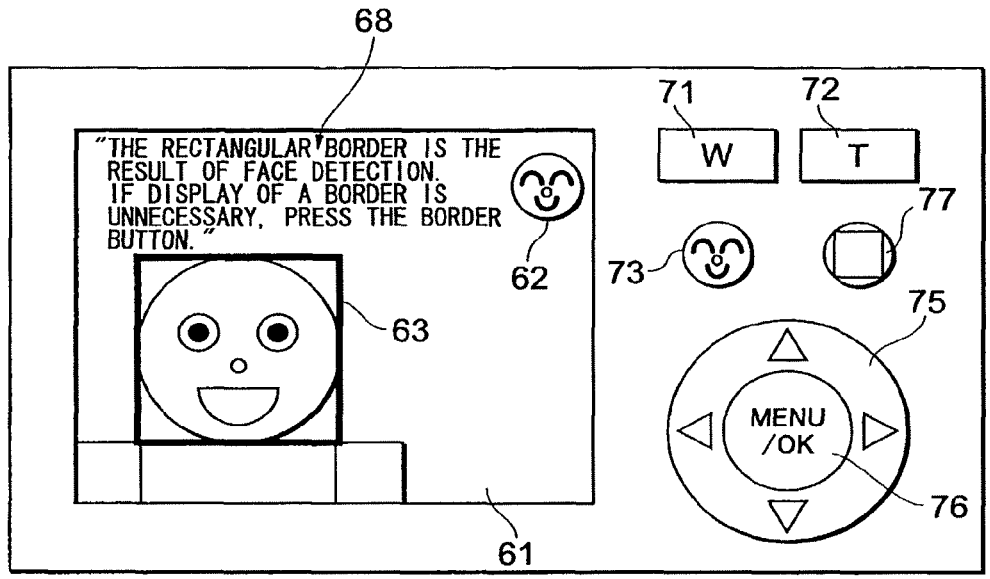
FIG. 11 illustrates the back side of a digital still camera according to this embodiment.
Figure 12:
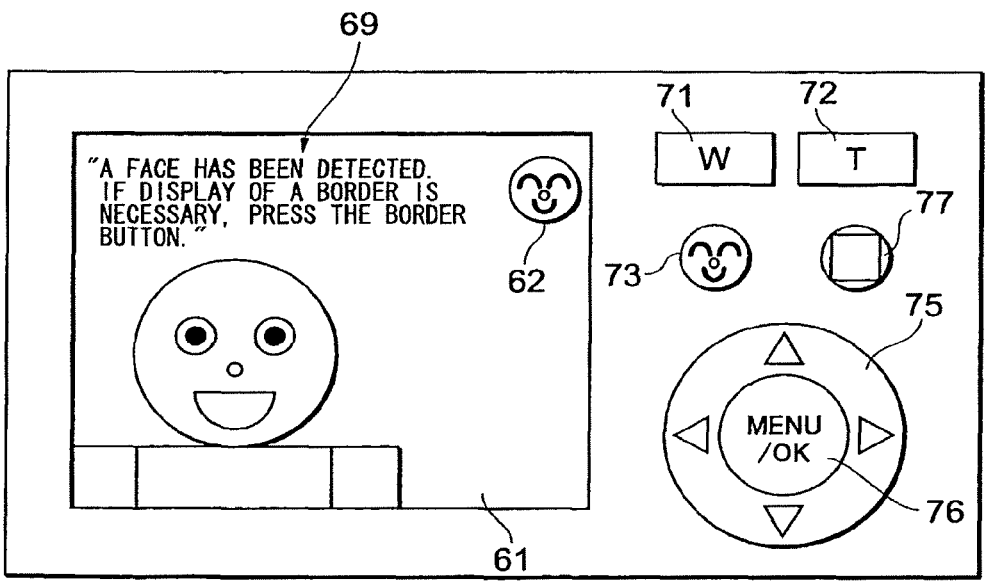
FIG. 12 illustrates the back side of the digital still camera according to this embodiment.
Figure 13:
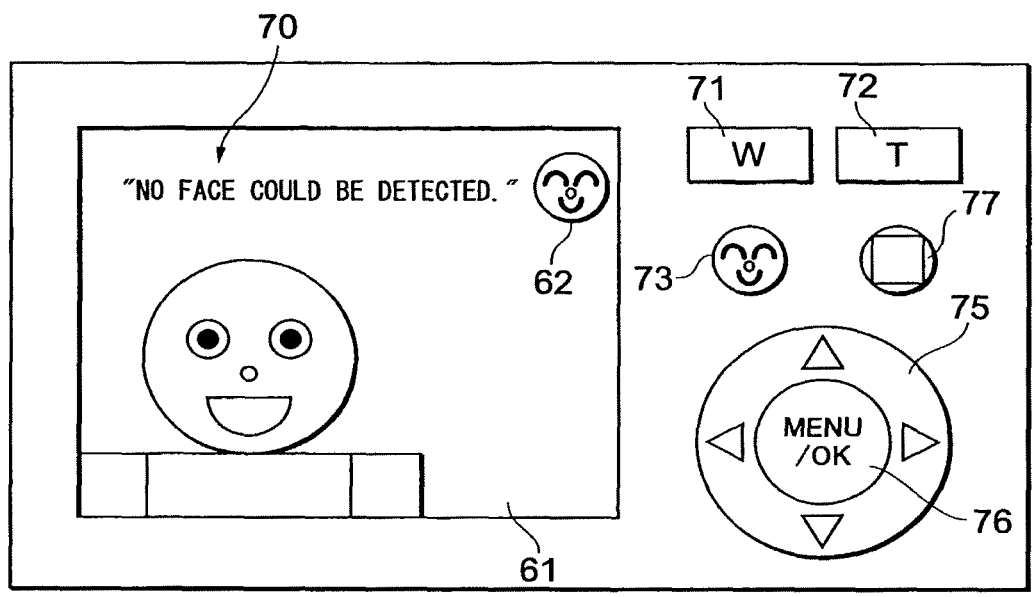
FIG. 13 illustrates the back side of the digital still camera according to this embodiment.

FIGS. 10 to 13 illustrate another embodiment. Here display or non-display of the detection border can be set by the user and the user is notified of a method of setting display and non-display of the detection border. Processing in FIG. 10 identical with that shown in FIG. 4 is identified by like step numbers and need not be described again. Components in FIGS. 11 to 13 identical with those shown in FIG. 2 or 3 are designated by like reference characters and need not be described again. As illustrated in FIGS. 11 to 13, the digital still camera in this embodiment is provided with a border button 77 on the right side of the face button 73. Display/non-display (on/off) of a detection border is set in accordance with pressing of the border button 77. A rectangle the shape of which is the same as that of the detection border 63 is indicated on the border button 77.

If the shutter-release button is not pressed through the first step of its stroke ("YES" at step 34A), face detection is performed in the image of the subject (step 35).

If a face is found in the image of the subject ("YES" at step 81), whether the detection-border display function has been set to ON or not is checked (step 82).

If the detection-border display function has been set to ON ("YES" at step 82), the detection border 63 is displayed so as to enclose the detected face, as illustrated in FIG. 11. Furthermore, in order to notify the user of display of the detection border 63, a text message 68 reading "THE RECTANGULAR BORDER IS THE RESULT OF FACE DETECTION." is displayed at the upper portion of the display screen 61, and in order to notify the user of a method of not displaying the detection border 63, a message 68 reading "IF DISPLAY OF A BORDER IS UNNECESSARY, PRESS THE BORDER BUTTON." also is displayed at the upper portion of the display screen 61 (step 83). By viewing these text messages 68, the user can understand the meaning of the detection border 63 that is being displayed on the display screen 61. And if display of the detection border 63 is unnecessary, the detection border 63 can be erased from the display screen 61 by pressing the border button 77. If the border button 77 is pressed ("YES" at step 84), then the detection border 63 is erased from the display screen 61, as illustrated in FIG. 12. Furthermore, in order to notify the user of the fact that a face has been detected and of a method of displaying the detection border 63, a text message 69 reading "A FACE HAS BEEN DETECTED. IF DISPLAY OF A BORDER IS NECESSARY, PRESS THE BORDER BUTTON." is displayed at the upper portion of the display screen 61. If the border button 77 is not pressed ("NO" at step 84), then the processing of step 85 is skipped.

If the detection-border display function has not been set to ON ("NO" at step 82), then, in order to notify the user of the fact that a face has been detected and of a method of displaying the detection border 63, the message 69 is displayed at the upper portion of the display screen 61 (step 86), as illustrated in FIG. 12. If the border button 77 is pressed ("YES" at step 87), then the detection-border display function changes from OFF to ON. Accordingly, as illustrated in FIG. 11, the messages 68 for notifying the user of the meaning of the detection border 63 and of a method of not displaying the detection border 63 are displayed at the upper portion of the display screen 61 (step 88). If the border button 77 is not pressed ("NO" at step 87), the processing of step 88 is skipped.

If a face is not found in face detection processing ("NO" at step 81), whether the detection-border display function has been turned ON is checked (step 89). If the detection-border display function has been turned ON ("YES" at step 89), then, as illustrated in FIG. 13, a text message 70 reading "NO FACE COULD BE DETECTED." is displayed at the upper portion of the display screen 61 in order to notify the user of the fact that the detection border 63 is not being displayed because a face has not been detected even though the function for displaying the detection border 63 has been turned ON, and not because the function for displaying the detection border 63 has been turned OFF. The user can verify that a face could not be detected. When the detection-border display function has not been set to ON ("NO" at step 89), the processing of step 90 is skipped.

In the embodiment described above, the display of the detection border 63 can be turned ON or OFF. However, with regard to an arrangement in which display of the detection border 63 cannot be turned ON or OFF, the user may be notified of the fact that a face has not been detected by indicating this using the message 70 of FIG. 13. By viewing the message 70, the user can ascertain that face detection processing is being executed. Therefore, if the user checks the image of the subject being displayed on the display screen 61 and decides that face detection processing is not necessary, the user may halt face detection processing, thereby making it possible to reduce power consumption.

FIGS. 14 to 18 illustrate another embodiment. In this embodiment, face detection processing is turned ON or OFF in accordance with the image sensing mode that has been set.

Figure 14:
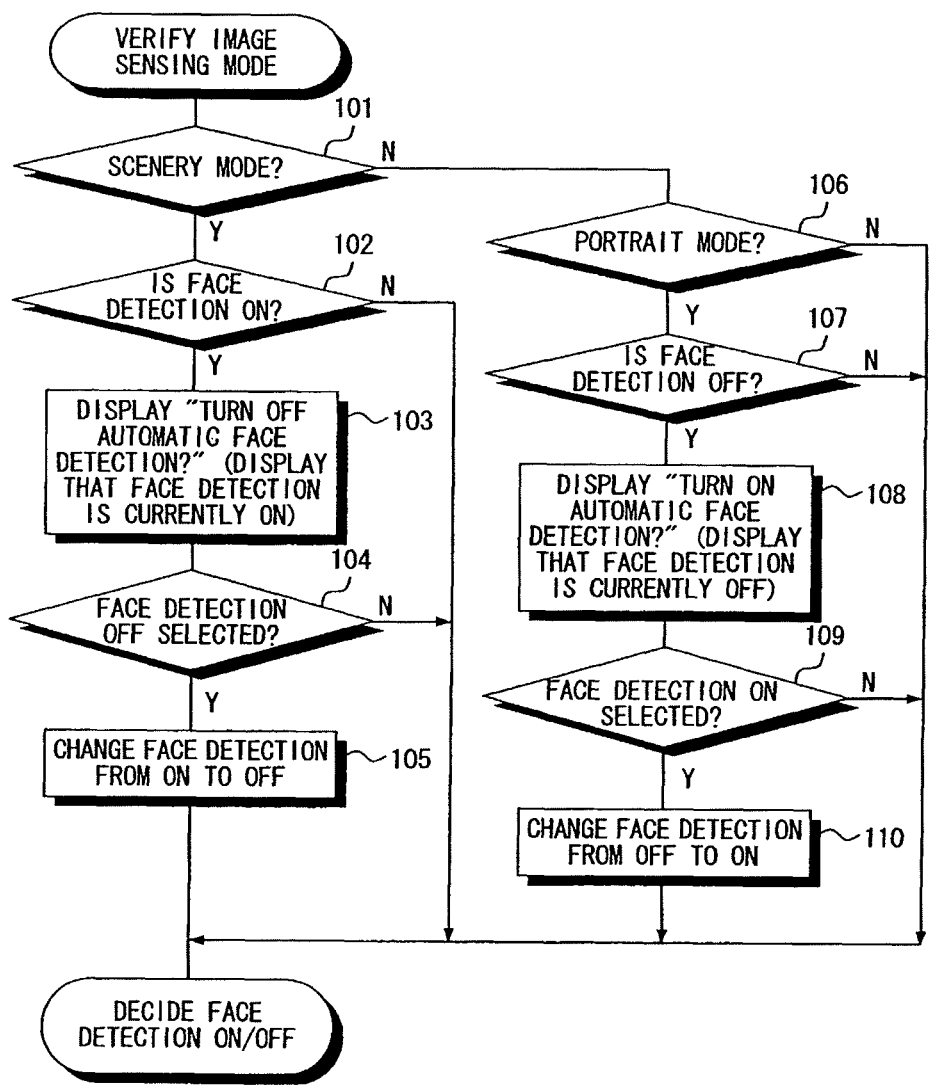
FIG. 14 is a flowchart illustrating processing for verifying an image sensing mode according to a further embodiment of the present invention.

FIG. 14 is a flowchart illustrating processing for verifying an image sensing mode. FIGS. 15 to 18 illustrate the back side of a digital still camera. Components in FIGS. 15 to 18 identical with those shown in FIG. 2 or 3 are designated by like reference characters and need not be described again.

Figure 17:
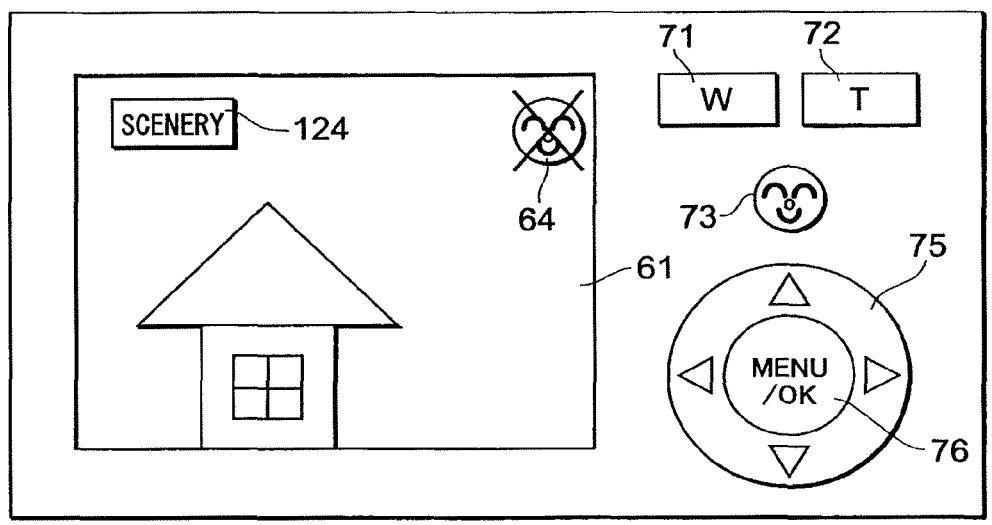
FIG. 17 illustrates the back side of the digital still camera according to this embodiment.
Figure 18:
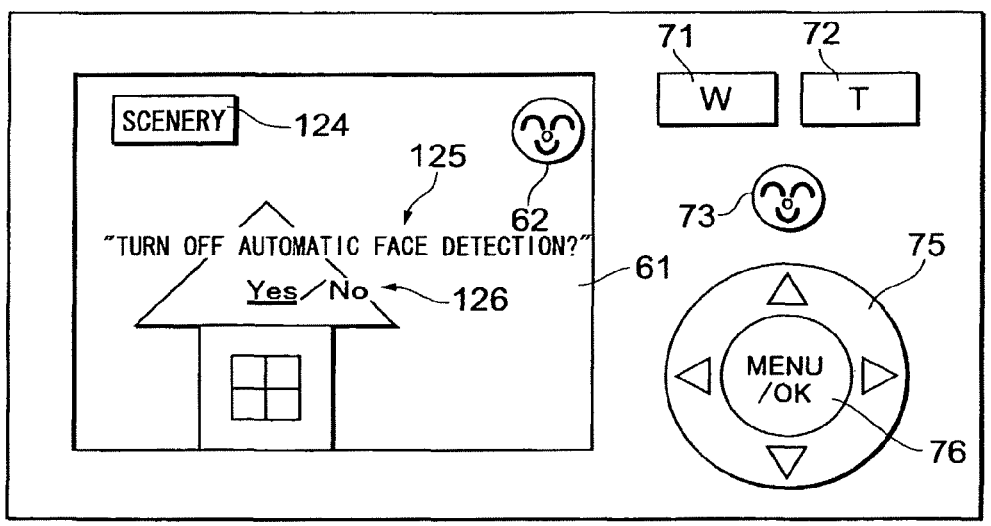
FIG. 18 illustrates the back side of the digital still camera according to this embodiment.

First, whether the scenery mode has been set as the image sensing mode is checked (step 101). If the scenery mode has been set ("YES" at step 101), a text message reading "SCENERY", which indicates that the scenery mode has been set, is displayed at the upper-left corner of the display screen 61, as illustrated in FIG. 17. Next, whether the camera has been set so as to execute face detection processing is checked (step 102). If the camera has been set in such a manner that face detection processing will be executed ("YES" at step 102), then a text question 125 reading "TURN OFF AUTOMATIC FACE DETECTION?" and text 126 reading "YES/NO" are displayed substantially at the center of the display screen 61 (step 103), as illustrated in FIG. 18. Further, the face-detection execution mark 62 is displayed. Either "YES" or "NO" in the text 126 is displayed in underlined fashion. The underlining is displayed beneath "YES" if the left arrow on the up, down, left, right button 75 is pressed, and beneath "NO" if the right arrow on the button 75 is pressed. If the menu/OK button 76 is pressed, the underlined answer is selected ("YES" at step 104) and face detection processing is changed over from ON to OFF (step 105). The face-detection non-execution mark 64 is displayed, as illustrated in FIG. 17.

If face detection processing is not ON ("NO" at step 102), then the processing of steps 103 to 105 is skipped. If turn-off of face detection processing is not selected ("NO" at step 104), then the processing of step 105 is skipped.

Figure 15:
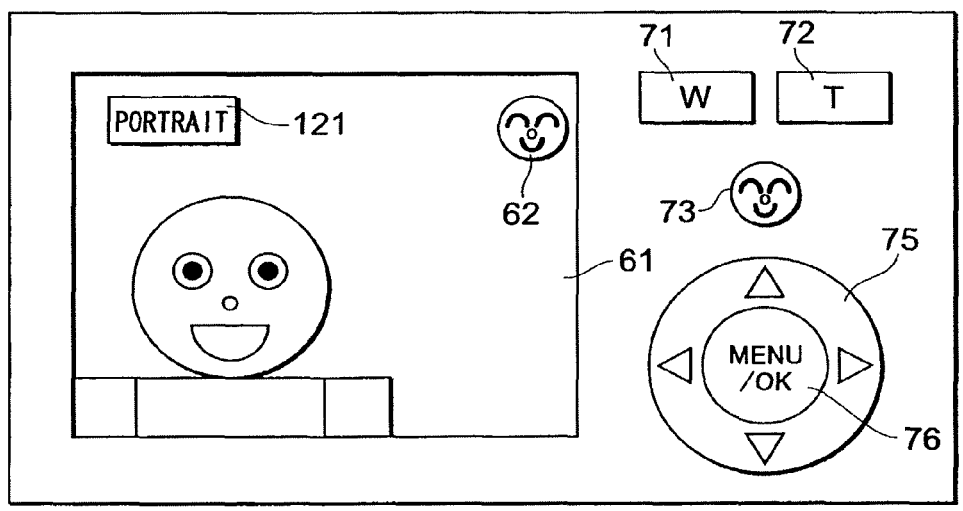
FIG. 15 illustrates the back side of a digital still camera according to this embodiment.
Figure 16:
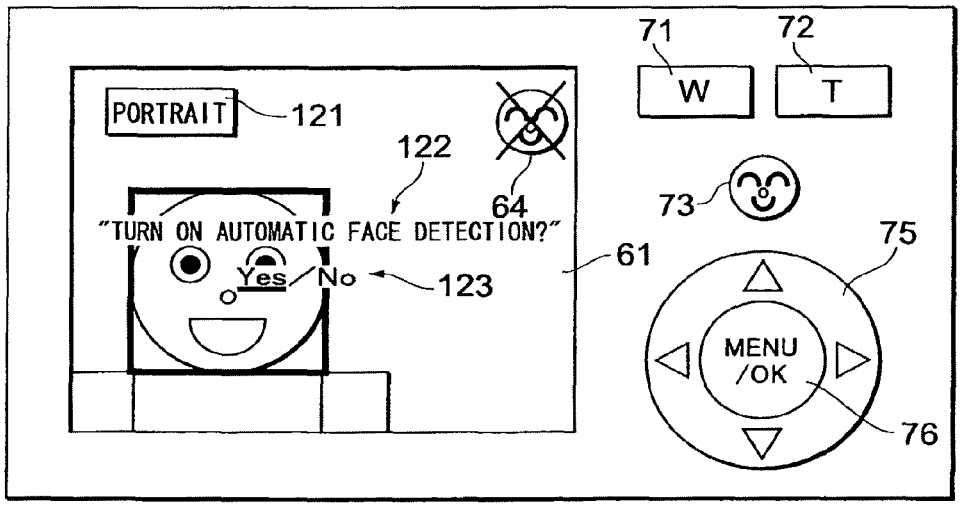
FIG. 16 illustrates the back side of the digital still camera according to this embodiment.

If the scenery mode has not been set as the image sensing mode ("NO" at step 101), then whether the portrait mode has been set is checked (step 106). If the portrait mode has been set ("YES" at step 106), then a text message reading "PORTRAIT", which indicates that the portrait mode has been set, is displayed at the upper-left corner of the display screen 61, as illustrated in FIG. 15. Next, whether the camera has been set so as to execute face detection processing is checked (step 107). If the camera has not been set in such a manner that face detection processing will be executed ("YES" at step 107), then a text question 122 reading "TURN ON AUTOMATIC FACE DETECTION?" and text 123 reading "YES/NO" are displayed substantially at the center of the display screen 61 (step 108), as illustrated in FIG. 16. Further, the face-detection non-execution mark 64 is displayed. Either "YES" or "NO" in the text 123 is displayed in underlined fashion. The underlining is displayed beneath "YES" if the left arrow on the up, down, left, right button 75 is pressed, and beneath "NO" if the right arrow on the button 75 is pressed. If the menu/OK button 76 is pressed, the underlined answer is selected. If "YES" is selected, the processing that turns face detection processing ON is selected ("YES" at step 109) and face detection processing is changed over from OFF to ON (step 110). The face-detection execution mark 62 is displayed, as illustrated in FIG. 15.

If face detection processing is ON ("NO" at step 107), then the processing of steps 108 to 110 is skipped. Further, if turn-on of face detection processing is not selected ("NO" at step 109), then the processing of step 110 is skipped. Furthermore, if neither the scenery mode nor the portrait mode has been set ("NO" at step 101 and at step 106), the processing of steps 107 to 110 is skipped.

If turn-on of face detection processing is not selected by the user, unnecessary face detection processing is not executed when the scenery mode is in effect. Conversely, if face detection processing is not turned OFF by the user when the portrait mode is in effect, then face detection processing will be executed. The ON or OFF setting of face detection processing is made depending upon the mode. This makes it possible to prevent a situation in which the user forgets to change over face detection processing. Further, it may be so arranged that when the portrait mode has been set, the color of a skin tone, for example, is detected and signal processing such as a color correction is executed so as to obtain an attractive skin-tone color, and it may be so arranged that when the scenery mode has been set, the color of the sky or mountains is detected and signal processing such as a color correction is executed so as to render these colors attractive.

Figure 19:
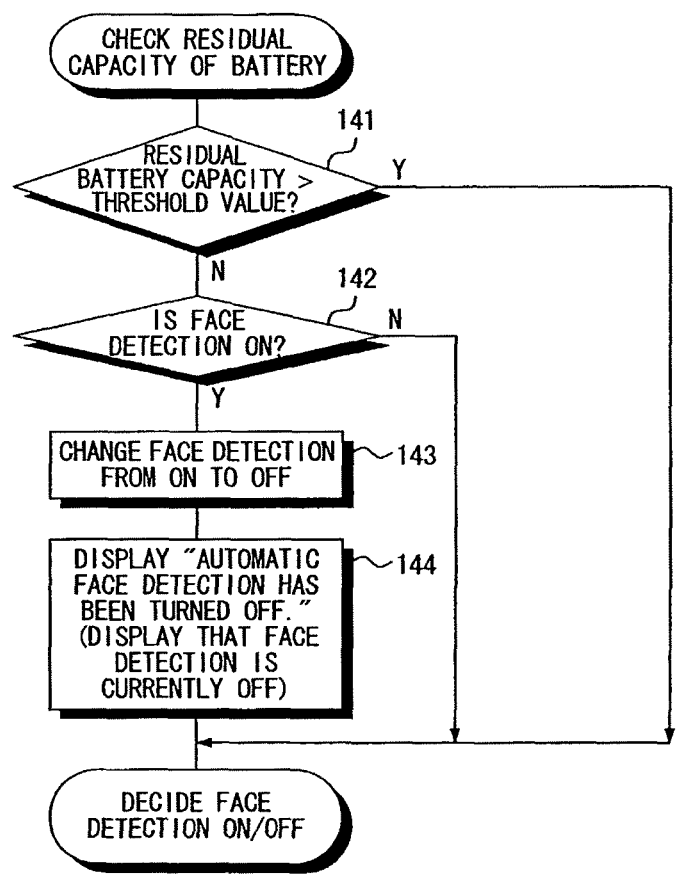
FIG. 19 is a flowchart illustrating processing for checking residual capacity of a battery according to a yet another embodiment of the present invention.
Figure 20:
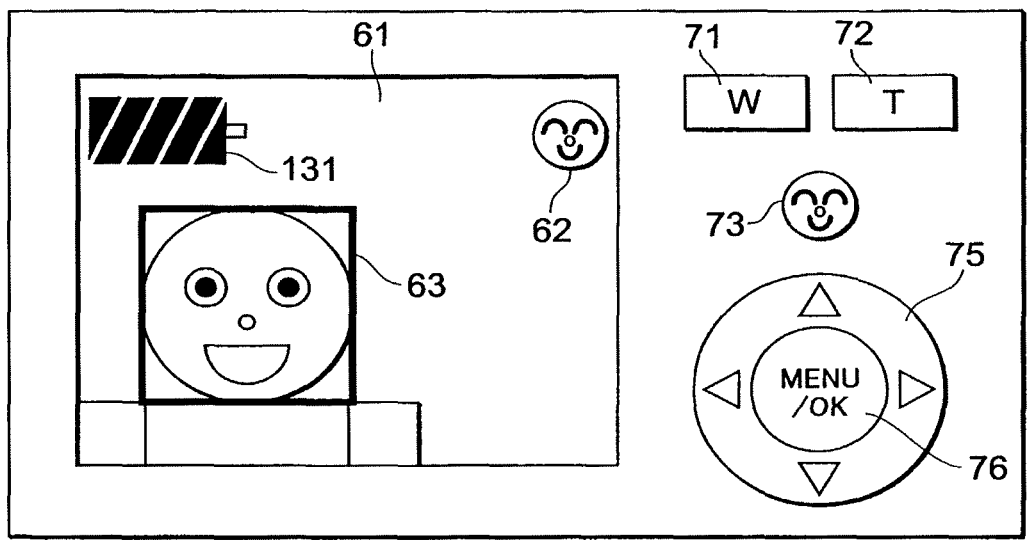
FIG. 20 illustrates the back side of a digital still camera according to this embodiment.
Figure 21:
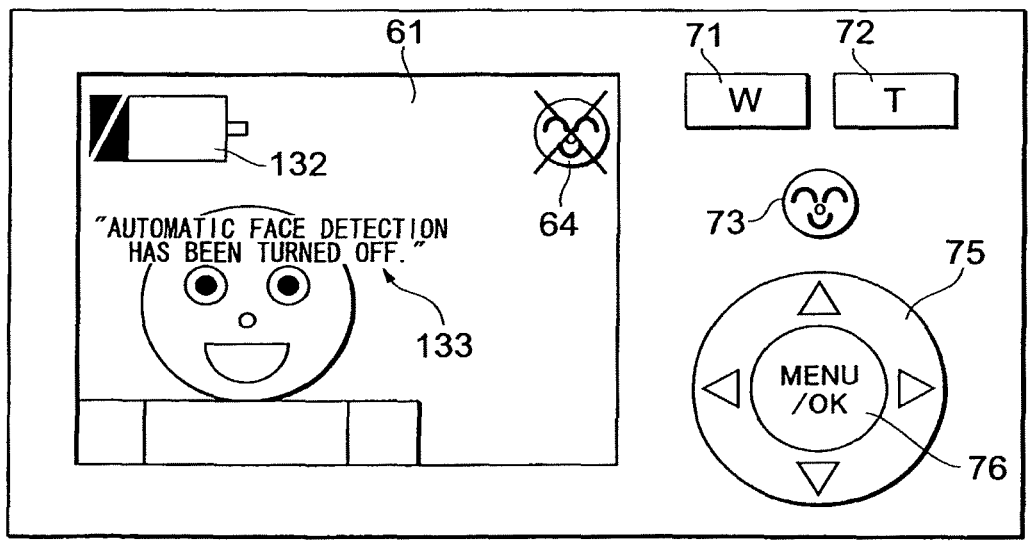
FIG. 21 illustrates the back side of the digital still camera according to this embodiment.

FIGS. 19 to 21 illustrate a further embodiment. In this embodiment, face detection processing is set to OFF when the battery has little residual capacity.

FIG. 19 is a flowchart illustrating processing for checking residual capacity of a battery, and FIGS. 20 and 21 illustrate the back side of a digital still camera. Components in FIGS. 20 and 21 identical with those shown in FIG. 2 or 3 are designated by like reference characters and need not be described again.

When the residual capacity of the battery that has been loaded in the digital still camera is detected, a battery mark conforming to the residual capacity is displayed on the display screen of the digital still camera. When the battery has a large residual capacity, a mark 131 indicating a battery the entirety of which is shaded in black is displayed at the upper-left corner of the display screen 61, as illustrated in FIG. 20. When the battery has a small residual capacity, a mark 132 indicating a battery only part of which is shaded in black in accordance with the residual capacity is displayed at the upper-left corner of the display screen 61, as illustrated in FIG. 21.

As shown in FIG. 19, whether the residual capacity of the battery is greater than a prescribed threshold value is checked (step 141).

If the residual capacity of the battery is equal to or less than the threshold value ("NO" at step 141), then whether face detection processing has been set to ON or not is checked (step 142). If face detection processing has been set to ON ("YES" at step 142), then face detection processing is changed over from ON to OFF in order to suppress consumption of a battery having little residual capacity (step 143). When this is done, a text message 133 reading "AUTOMATIC FACE DETECTION HAS BEEN TURNED OFF." is displayed substantially at the center of the display screen 61 (step 144), as illustrated in FIG. 21. Thus the user is notified that face detection processing is OFF.

If the residual capacity of the battery is greater than the threshold value ("YES" at step 141), execution of face detection processing is given precedence over a reduction in power consumption. Processing from steps 142 to 144, therefore, is skipped. Further, if face detection processing has been set to OFF ("NO" at step 142), then the processing of steps 143 and 144 is skipped.

Figure 22:
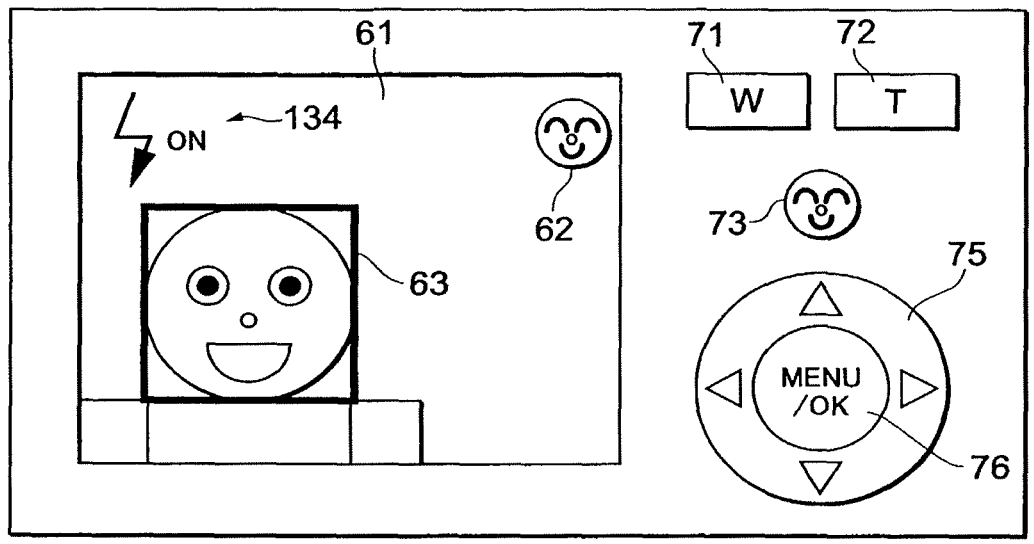
FIG. 22 illustrates the back side of a digital still camera according to a modification.
Figure 23:
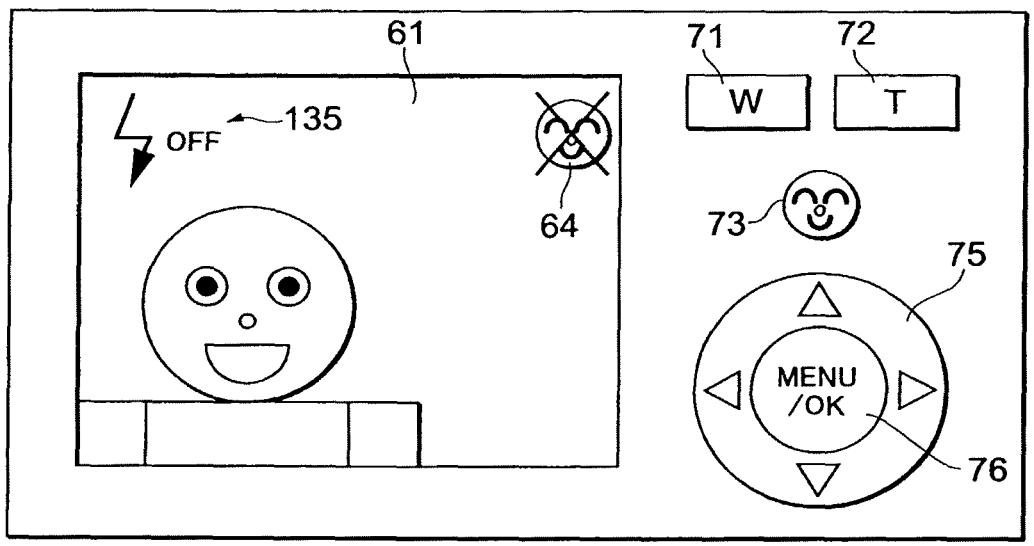
FIG. 23 illustrates the back side of the digital still camera according to this modification.

FIGS. 22 and 23 illustrate a modification and show the back side of a digital still camera. Components in FIGS. 22 and 23 identical with those shown in FIG. 2 or 3 are designated by like reference characters and need not be described again.

As shown in FIG. 22, a forcible flash mark 134 is displayed at the upper-left corner of the display screen 61 if a forcible flash mode has been set (the forcible flash mode can be set from a menu that is displayed on the display screen 61 in the manner described above). Further, if the forcible flash mode has been set, often the subject is a person. Even if face detection processing has been set to OFF, therefore, this processing is changed over to ON. The detection border 63 is displayed so as to enclose a face found by face detection processing. It is possible to perform a flash adjustment, brightness correction or red-eye correction, etc., utilizing the face.

If the forcible flash mode has not been set, then face detection processing is set to OFF and the face-detection non-execution mark 64 is displayed, as illustrated in FIG. 23. Furthermore, a flash OFF mark 135 is displayed at the upper-left corner of the display screen 61.

It may be so arranged that if face detection has been changed over, the user is notified of the fact that the changeover has been made in the manner described above.

In the embodiment described above, a face has been detected as a target image. However, it may be so arranged that the image of an eye or some other image is detected rather than a face.

In the embodiment described above, face detection processing is turned OFF if residual battery capacity is small or if the forcible flash mode has been set to OFF. However, the user may be notified of the fact that the setting of face detection processing is inappropriate. The user can set the camera in such a manner that face detection processing is halted voluntarily.

Figure 24:
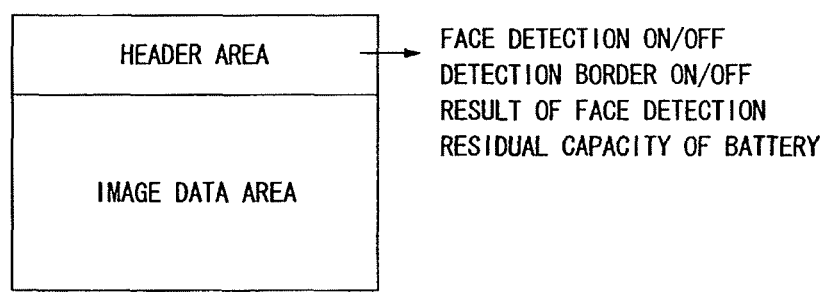
FIG. 24 illustrates the file structure of an image file.

FIG. 24 illustrates an example of the file structure (data structure) of an image file.

A header area and an image-data recording area are defined in an image file. Subject-image data is recorded in the image data area. Management data for managing the subject-image data that has been recorded in the image data area is recorded in the header area.

In this embodiment, data representing the following is recorded in the header area: whether or not face detection processing has been set using the face button 73 (face detection ON/OFF); whether or not display of the face detection border has been set (detection border ON/OFF); the result of face detection processing (position, size, etc.); and residual battery capacity. Residual battery capacity may be that which prevails when data is recorded in the header area, that which prevailed when face detection processing was executed in a case where face detection processing was executed or, in a case where face detection processing is not executed because of a small residual battery capacity, that which prevailed when it was determined that face detection processing would not be executed. Further, both data representing whether or not face detection processing is set and data representing the result of face detection processing need not be recorded, and it may be so arranged that either one of these items of data is written to the header area.

It may be so arranged that subject-image data obtained by image sensing is recorded as is in the image data area. It may be so arranged that in a case where face detection processing is executed and a face portion has been detected from within the image of a subject, data representing the subject image that has undergone processing for making the detected face portion appear attractively (e.g., processing for brightening the face, processing for focusing on the face or signal processing for improving face color) is recorded in the image data area.

By way of example, in a case where data indicating that face detection processing has been set has been recorded in the header area, data representing the subject image that has undergone processing to make the face detected by face detection processing appear attractively is recorded in the image data area. By adopting this arrangement, the fact that a subject image represented by subject-image data that has been recorded in the image data area has been subjected to processing for making the face appear attractively can be ascertained by reading the data indicating that face detection processing has been set from the header area at the time of playback. Further, by also recording the result of face detection in the header area, which portion of the subject image is the face can be ascertained. It goes without saying that even in a case where data indicating that face detection processing has been set has been recorded in the header area, subject-image data that has not undergone processing for making a face appear attractively may be recorded.

Further, in a case where data indicating that face detection processing has not been set has been recorded in the header area, subject-image data that has not undergone processing for making a face appear attractively would be recorded in the image data area. By recording in the header area data indicating that face detection processing has not been set, at playback it can be ascertained from the data indicating that face detection processing has not been set the fact that face detection processing has not been applied to the subject-image data that has been recorded in the image data area. This means that face detection processing can be executed as necessary.

Furthermore, by recording data indicating residual battery capacity in the header area, as mentioned above, if data indicating that face detection processing has not been set has been recorded in the header area, then the user can be notified of the possibility that face detection processing has not been executed because of small residual battery capacity.

Data indicating that face detection processing has been set and data indicating the face detection processing has not been set may be turned ON or OFF by a forcible detection setting, such as ON/OFF based upon an automatic face detection setting, or a setting the face button 73.

Furthermore, it may be so arranged that data indicating whether or not display of a detection border has been set is recorded in the header area, as mentioned above. By checking the data indicating the setting of the detection border at the time of playback, the status of the detection-border display setting can be ascertained when subject-image data is recorded.

As many apparently widely different embodiments of the present invention can be made without departing from the spirit and scope thereof, it is to be understood that the invention is not limited to the specific embodiments thereof except as defined in the appended claims.

What is claimed is:

1. A face detecting apparatus comprising:
a detection processing setting device for setting whether or not processing for detecting a face from within the image of a subject will be executed;
a detection processing determination device for determining whether said detection processing setting device has set execution of face detection processing;
a face detecting device, responsive to a determination by said detection processing determination device that face detection processing will be executed, for executing processing for detecting a face from within the image of a subject represented by applied subject-image data;
a setting notification device, responsive to a determination by said detection processing determination device that face detection processing will be executed, for notifying of the fact that execution of face detection processing has been set by said detection processing setting device; and
an image sensing device for sensing the image of a subject;
wherein said face detecting device, responsive to a determination by said detection processing determination device that face detection processing will be executed, executes processing for detecting a face from within the image of a subject represented by subject-image data acquired by said image sensing device;
said apparatus further comprising:
an image sensing mode setting device for setting a first image sensing mode, which assumes that a person is a main subject, or a second image sensing mode, which assumes that something other than a person is a main subject;
a control device, responsive to setting of the first image sensing mode by said image sensing mode setting device, for applying control for the first image sensing mode to subject-image data acquired by said image sensing device, and responsive to setting of the second image sensing mode by said image sensing mode setting device, for applying control for the second image sensing mode to subject-image data that has been output from said image sensing device; and
verification notification device for giving notification of at the fact that face detection processing will not be executed, in response to setting of the first image sensing mode by said image sensing mode setting device and, moreover, to a determination by said detection processing determination device that face detection processing will not be executed, and the fact that face detection processing will be executed, in response to setting of the second image sensing mode by said image sensing mode setting device and, moreover, to a determination by said detection processing determination device that face detection processing will be executed.

2. The apparatus according to claim 1, further comprising a first display control device for exercising control to display, on a display screen, the image of the subject represented by the subject-image data acquired by said image sensing device;
wherein said setting notification device is a second display control device, responsive to a determination by said detection processing determination device that face detection processing will be executed, for exercising control to display, on the display screen on which the image of the subject is being displayed, the fact that execution of face detection processing has been set by said detection processing setting device.

3. The apparatus according to claim 1, further comprising a result notification device, responsive to a determination by said detection processing determination device that face detection processing will be executed, for notifying of result of detection by said face detecting device.

4. The apparatus according to claim 1, further comprising:
a notification setting device for setting whether notification is to be given of result of detection by said face detecting device; and
a result notification device, responsive to the fact that notification of result of detection has been set by said notification setting device and, moreover, to a determination by said detection processing determination device that face detection processing will be executed, for notifying of result of detection by said face detecting device.

5. The apparatus according to claim 1, further comprising:
a setting method notification device, responsive to a determination by said detection processing determination device that execution of face detection processing will be executed, for giving notification of at least one of a setting method for not executing face detection processing and a setting method for executing face detection processing by said face detecting device.

6. The apparatus according to claim 1, further comprising:
a face detection control device, responsive to setting of the first image sensing mode by said image sensing mode setting device and, moreover, to a determination by said detection processing determination device that face detection processing will not be executed, for controlling said face detecting device in such a manner that face detection processing in said face detecting device will be executed, and responsive to setting of the second image sensing mode by said image sensing mode setting device and, moreover, to a determination by said detection processing determination device that face detection processing will be executed, for controlling said face detecting device in such a manner that face detection processing in said face detecting device will be halted.

7. The apparatus according to claim 6, further comprising a halt notification device for notifying of the fact that the face detection processing has halted or of the fact that a setting in said detection processing setting device is inappropriate, in accordance with halt control in said face detection control device.

8. The apparatus according to claim 1, wherein the first image sensing mode is a mode that assumes that a person is a main subject, as is the case in a portrait mode or sports mode; and the second image sensing mode is a mode that assumes that something other than a person is the main subject, as is the case in a scenery mode or night-scene mode.

9. The apparatus according to claim 1, wherein said the face detecting device operates on electric power provided by a battery;

said apparatus further comprising:
a residual-capacity determination device for determining whether residual capacity of the battery has fallen below a predetermined threshold value; and
a face detection control device, responsive to a determination by said residual-capacity determination device that residual capacity of the battery has fallen below the predetermined threshold value and, moreover, to a determination by said detection processing determination device that face detection processing will be executed, for halting face detection processing in said face detecting device.

10. The apparatus according to claim 1, further comprising:
a flash light-emission setting device for setting a flash light-emission mode;
a flash light-emission control device, responsive to setting of the flash light-emission mode by said flash light-emission setting device, for controlling a flash light-emission unit so as to flash-illuminate a subject whose image is sensed by said image sensing device;
a face detection control device, responsive to setting of the flash light-emission mode by said flash light-emission setting device and, moreover, to a determination by said detection processing determination device that face detection processing will not be executed, for controlling said face detecting device in such a manner that face detection processing in the face detecting device will be executed; and
an execution notification device for notifying of the fact that the face detection processing will be executed or of the fact that a setting in said detection processing setting device is inappropriate, in accordance with control exercised by said face detection control device.

11. The apparatus according to claim 1, further comprising:
a control device, responsive to setting by said image sensing mode setting device of the first image sensing mode that assumes a person is the main subject, for controlling said face detecting device in such a manner that face detection processing will be executed.

12. The apparatus according to claim 1, further comprising:
a control device, responsive to setting by said image sensing mode setting device of the second image sensing mode that assumes something other than a person is the main subject, for controlling said face detecting device in such a manner that face detection processing is halted.

13. The apparatus according to claim 1, further comprising:
a flash light-emission control device for controlling a flash light-emission unit so as to flash-illuminate a subject whose image is sensed by the image sensing device; and
a control device, responsive to execution of a flash light-emission that is based upon said flash light-emission control device, for controlling said face detecting device in such a manner that face detection processing will be executed.

14. The apparatus according to claim 13, further comprising a flash light-emission setting device for setting a flash light-emission mode;
wherein said flash light-emission control device, responsive to setting of the flash-light emission mode by said flash light-emission setting device, controls a flash light-emission unit so as to perform a flash light-emission.

15. The apparatus according to claim 13, further comprising a flash-off setting device for forcibly turning off a flash light-emission;
wherein said flash light-emission control device turns off the flash light-emission in response to setting of flash turn-off by said flash-off setting device; and
a halt control device for controlling said face detecting device so as to halt face detection processing in accordance with the flash-off setting by said flash-off setting device.

16. An image file recording apparatus comprising:
the face detecting apparatus according to claim 1; and
a first writing device for writing, to the same image file, the subject-image data that has been subjected to processing that is based upon the face detected by said face detecting device, and data indicating that face detection processing has been set by said face processing setting device.

17. The apparatus according to claim 16, wherein said first writing device writes data indicating the result of detection by said face detecting device to the same image file.

18. The apparatus according to claim 16, wherein in a case where processing based upon a face that has been detected by said face detecting device is executed, said first writing device writes, to the same image file, a value relating to the processing based upon the face that has been detected by said face detecting device.

19. The apparatus according to claim 16 further comprising:
a second writing device for writing, to the same image file, the subject-image data, data indicating that face detection processing has been set by said detection processing setting device, and data indicating result of detection by said face detecting device.

20. The apparatus according to claim 16, further comprising:
a third writing device, responsive to a determination by said detection processing determination device that face detection processing will not be executed, for writing, to the same image file, the subject-image data and data indicating that face detection processing has not been executed.

21. The apparatus according to claim 16, wherein said apparatus operates based upon electric power provided by a battery;
said apparatus further comprising a residual-capacity detecting device for detecting residual capacity of the battery;
said first writing device writing data, which represents the residual capacity detected by said residual-capacity detecting device, to the same image file.

22. The image file recording apparatus according to claim 16, further comprising:

a detection-border display setting device for setting whether a detection border, which specifies a face detected by said face detecting device, will be displayed on the display screen;

a third display control device for controlling the display device so as to display a detection border on the display screen in accordance with a setting made by said detection-border display setting device; and a forth writing device for writing the subject-image data and data indicating the setting by said detection-border display setting device in the same image file.

23. A method of controlling a face detecting apparatus, comprising the steps of:

setting whether or not processing for detecting a face from within the image of a subject will be executed;

determining by a detection processing determination circuit whether execution of face detection processing has been set;

in response to a determination by said detection processing determination circuit that face detection processing will be executed, executing processing, by a face detecting circuit, for detecting a face from within the image of a subject represented by applied subject-image data from an image sensing device which senses the image of a subject;

in response to a determination by said detection processing determination circuit that face detection processing will be executed, notifying of the fact that execution of face detection processing has been set;

setting a first image sensing mode, which assumes that a person is a main subject, or a second image sensing mode, which assumes that something other than a person is a main subject by an image sensing mode setting circuit;

responsive to setting of the first image sensing mode by said image sensing mode setting circuit, applying control for the first image sensing mode to subject-image data acquired by said image sensing circuit, and responsive to setting of the second image sensing mode by said image sensing mode setting circuit, for applying control for the second image sensing mode to subject-image data that has been output from said image sensing device; and giving notification of the fact that face detection processing will not be executed, in response to setting of the first image sensing mode by said image sensing mode setting circuit and, moreover, to a determination by said detection processing determination circuit that face detection processing will not be executed, and the fact that face detection processing will be executed, in response to setting of the second image sensing mode by said image sensing mode setting circuit and, moreover, to a determination by said detection processing determination circuit that face detection processing will be executed.

* * * * *